(12) United States Patent
Makhija et al.

(10) Patent No.: US 11,348,352 B2
(45) Date of Patent: May 31, 2022

(54) CONTRACT LIFECYCLE MANAGEMENT

(71) Applicant: NB Ventures, Inc., Clark, NJ (US)

(72) Inventors: Subhash Makhija, Westfield, NJ (US); Santosh Ganesh Dattatraya Bhat, Wadala East (IN); Nikunj Natwarlal Vasa, West Mumbai (IN); Avishek Jana, Thane (IN); Nishanth Koganti, Hyderabad (IN); Venkata Sri Harsha Vemuluru, Hyderabad (IN); Shivendra Singh Malik, Vasco-da-Gama (IN); Aditi Asthana, Mumbai (IN)

(73) Assignee: NB VENTURES, INC., Clark, NJ (US)

( * ) Notice: Subject to any disclaimer, the term of this patent is extended or adjusted under 35 U.S.C. 154(b) by 91 days.

(21) Appl. No.: 16/726,998

(22) Filed: Dec. 26, 2019

(65) Prior Publication Data

US 2021/0201013 A1 Jul. 1, 2021

(51) Int. Cl.
| | |
|---|---|
| G06F 16/25 | (2019.01) |
| G06V 30/412 | (2022.01) |
| G06K 9/62 | (2022.01) |
| G06V 30/414 | (2022.01) |

(52) U.S. Cl.
CPC .......... G06V 30/412 (2022.01); G06F 16/258 (2019.01); G06K 9/6257 (2013.01); G06K 9/6264 (2013.01); G06V 30/414 (2022.01)

(58) Field of Classification Search
CPC .............. G06F 16/258; G06K 9/00449; G06K 9/00463; G06K 9/00469; G06K 9/6202; G06K 9/6257; G06K 9/6264; G06K 2209/01

See application file for complete search history.

(56) References Cited

U.S. PATENT DOCUMENTS

| | | | |
|---|---|---|---|
| 2014/0337429 A1* | 11/2014 | Asenjo | G06Q 10/0637 709/204 |
| 2017/0061352 A1* | 3/2017 | Kogut-O'Connell | G06Q 50/18 |
| 2017/0287090 A1* | 10/2017 | Hunn | H04L 9/0643 |
| 2018/0268506 A1* | 9/2018 | Wodetzki | G06K 9/628 |
| 2019/0138571 A1* | 5/2019 | Dimerman | G06F 17/18 |
| 2019/0354582 A1* | 11/2019 | Schafer | G06F 17/16 |
| 2020/0099530 A1* | 3/2020 | Khatib | H04L 9/085 |
| 2020/0380403 A1* | 12/2020 | Aggarwal | G06K 9/6262 |

* cited by examiner

*Primary Examiner* — Peet Dhillon
(74) *Attorney, Agent, or Firm* — David M. Breiner; BrownWinick Law Firm

(57) ABSTRACT

The present invention discloses a method, a system and a computer program product for Contract management. The invention includes optical character recognition for extraction of data attributes from the contracts. The invention further provides AI engine configured for processing a contract creation request through a bot based on analysis of a set of parameters associated with the request.

37 Claims, 18 Drawing Sheets

| S. No | Example Contract Sentence | Extracted Data Elements |
|---|---|---|
| 1 | This Master Agreement for Construction Services is entered into, to be | Element: Agreement Type |
| 2 | effective as of the third day of January 2020 ("Effective Date"), by and between | Element: Effective Date |
| 3 | ABC Limited ("Customer"), with its principal place of business located at | Element: Entity Name |
| 4 | Sky view Plaza, New York city, New York, United States of America and XYZ | Element: Entity Address |
| 5 | Constructions Inc ("Contractor"), with its principal place of business located at | Element: Supplier Entity Name |
| 6 | Coral Heights, San Francisco, California, United States of America. | Element: Supplier Entity Address |

FIG. 6

| S.No | Example Contract Data Attribute/Clauses | Data Attribute Category |
|---|---|---|
| 1 | In the performance of the Services, Customer and "XYZ Pvt. Ltd" may have access to or be exposed to information of the other party not generally known to the public, including, but not limited to software, product plans, marketing and sales information, customer lists, "know-how," or trade secrets which may be designated as being confidential or which, under the circumstances surrounding disclosure, ought to be treated as confidential (collectively, "Confidential Information"). Confidential Information may not be shared with third parties unless such disclosure is to personnel of "XYZ"" or Customer, including employees, agents and subcontractors, on a "need-to-know" basis in connection with its performance obligations pursuant to this MSA, so long as such personnel have agreed to treat such Confidential Information under terms at least as restrictive as those herein. | Attribute: Confidentiality |
| 2 | Either party may terminate this MSA or the Service Order and/or SOW in the event that the other party materially defaults in performing any obligation under this MSA (including any Service Order/SOW) and such default continues un-remedied for a period of thirty (30) days following written notice of default. If this MSA or the Service Order and/or SOW is terminated by Customer prior to the Service term expiration date for any reason other than "XYZ's" breach, Customer agrees to pay to XYZ. (i) for the Consulting Services, all unpaid Consulting Service fees as set forth on the Service Order and/or SOW for the Consulting Services performed through the effective termination date; and (ii) for MSS Services, all unpaid MSS Service fees as set forth on the Service Order for the MSS Services performed through the effective termination date plus a termination fee equal to the MSS Service fees that will become due during the remaining term of the Service Order(s). | Attribute: Termination |
| 3 | XYZ shall defend, indemnify and hold harmless the Customer Indemnified Parties from any damages, costs and liabilities, expenses (including reasonable and actual attorney's fees) ("Damages") actually incurred or finally adjudicated as to any third-party claim or action alleging that the Products, Services or any Customer Reports prepared or produced by XYZ and delivered pursuant to this MSA infringe or misappropriate any third party's patent, copyright, trade secret, or other intellectual property rights enforceable in the country(ies) in which the Products, Services or any Customer Reports are performed or prepared for Customer by XYZ ("Indemnified Claims"). | Attribute: Indemnification |

FIG. 7

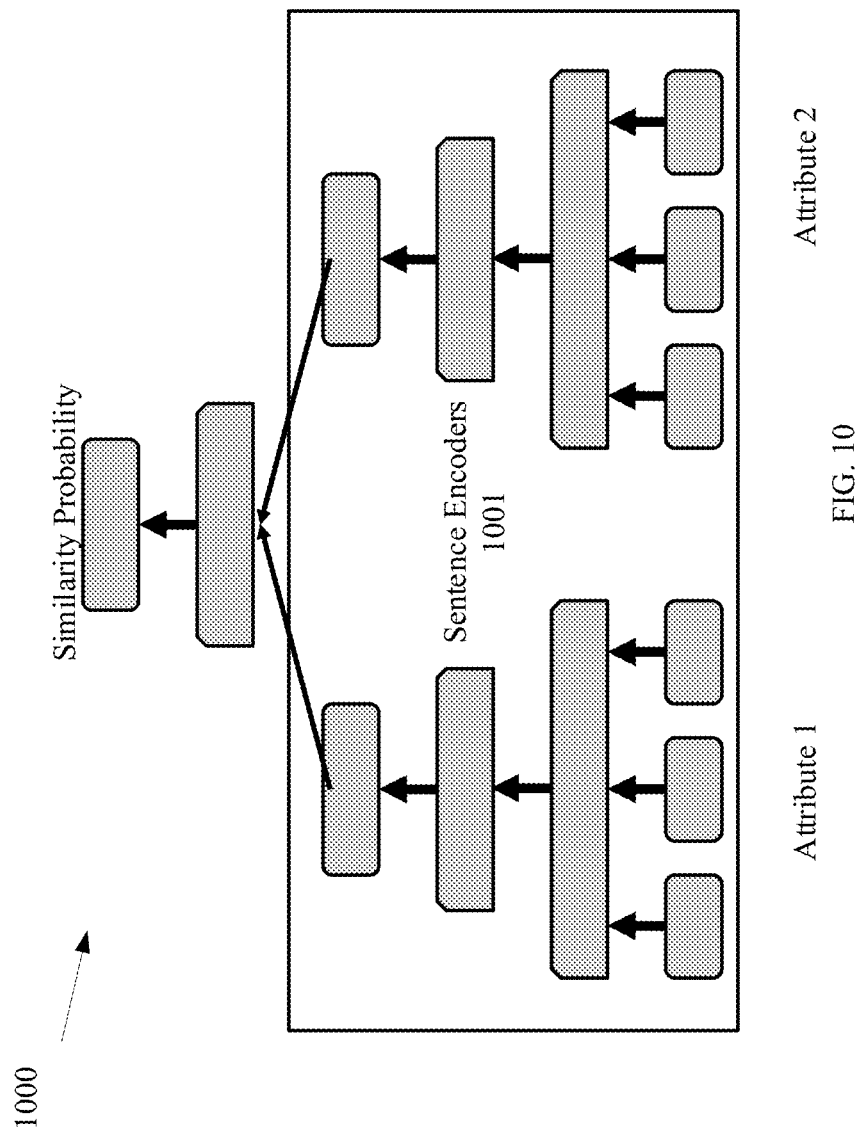

| S. No | Example Contract Sentence | Data Object |
|---|---|---|
| 1 | The Term of this Agreement shall be from July 31, 2009 to July 31, 2011. The Agreement may be renewed for additional two-year terms following the initial term, upon written agreement of the parties. The parties must mutually inform each other of their intention to renew the Agreement before June 1 of each year in which the Agreement is set to terminate | Data Object: Template |
| 2 | The Term of this Agreement shall be from July 31, 2009 to July 31, 2011. The Agreement will be renewed for additional two-year terms following the initial term, upon written agreement of the parties. The parties must mutually inform each other of their intention to renew the Agreement after June 1 of each year in which the Agreement is set to terminate | Data Object: Contract |

CONTRACT LIFECYCLE MANAGEMENT

BACKGROUND

1. Technical Field

The present invention relates generally to Contract management. More particularly, the invention relates to systems, methods and computer program product for self-executing Contracts management application.

2. Description of the Prior Art

Contract management refers to creating effective contracts through negotiations on their respective terms and conditions. Since, the legal consequences of breach of a contract may mean end of business for any organization, such terms need to be carefully interpreted and agreed before execution.

There are different types of contracts and the terms determine the rights and obligations of each party of the contract. Contracts like fixed price contracts and cost-reimbursement contracts or even a non-disclosure agreement imposes liabilities on an organization or an individual. Considering, the extent of caution that needs to be exercised and the varying nature of these contracts, automation of any process in contract management is extremely difficult and risky. Moreover, time and material contracts where the scope may not be clear, assessment of the risks involved, and determination of agreeable terms requires highly accurate processing of contract data.

There are prior art contract management systems such as U.S. Pat. No. 9,646,354 "Predictive approach to Contract management" however, the approach by such prior art systems for contract management is highly inaccurate and risky as it does not consider the varying circumstances for different type of contracts. Moreover, such an approach does not consider risks involved with suggested changes from a negotiating entity in terms of impact of those changes to the nature of engagement in the Contract. Also, the prior art systems do not identify risk clauses in the contract with accurate prediction. Further, the prediction model is very slow as it does not utilize advanced techniques for data processing depending on the type of clause or suggested changes to the clause.

The nature of data involved in a contract requires specific techniques for extraction and processing of data. Also, a contract lifecycle not only includes creation, negotiation, and execution but to ensure the obligations under the contract are appropriately fulfilled within the timelines is a crucial missing element of any contract management application. While, the techniques for automated contract creation are obsolete, less accurate and time consuming, the performance of a contract to ensure safety of any business organization is never considered.

Accordingly, there is a need in the art for improved systems and methods of data classification pertaining to procurement spent data.

SUMMARY

In an embodiment the present invention discloses a method of Contract management. The method includes the steps of receiving a contract creation request through one or more application at a server. The method includes identifying and analyzing a set of parameters associated with the request and based on analysis of the parameters, determining one or more required data attributes and generate at least one data script configured to process the request by an AI engine through a bot. The method includes identifying position of the data attributes in a contract and creating a contract template for execution, and in response to receipt of changes in the contract template from one or more negotiating entities, identifying risk associated with the changes wherein the crawler identifies and processes the changes through a bot for determining an action to be performed.

In an embodiment of the invention, a plurality of contract data is extracted from one or more data objects by a data extraction method. The data extraction method includes identifying a type of data object, sending the data object to at least one data recognition training model for identification of at least one data attribute wherein the data recognition training model processes the data object based on prediction analysis by a bot for obtaining the data attribute with a confidence score, drawing a bounded box around the identified data attribute by a region of interest script. The method includes the step of cropping the at least one identified data attribute in the drawn box, extracting text data from the data attribute by optical character recognition; and validating the text data after processing through an AI based data validation engine.

In an embodiment the method of contract management includes identifying at least one KPI (Key performance indicators) data from the data attributes of the executed contract. The method also includes extracting KPI data by structured based optical character recognition wherein a table in the data object is extracted and the KPI data is obtained for processing; and determining a productivity/reliability score for the entity based on the extracted KPI data, wherein the entity specific contract database enables processing of the contract data and an aggregated KPI data associated with the entity to generate a productivity/reliability score for the entity.

In a related exemplary embodiment, the KPI data are utilized for structuring of future contract data attributes of one or more entities. Moreover, in case of processing through an entity specific data model, the identification of KPI enables faster negotiations of the data attributes, thereby enabling faster execution of the contracts.

In an embodiment the invention provides a contract management system. The system includes a server configured for receiving a contract creation request through one or more applications, an AI engine configured for processing the request through a bot wherein the AI engine processes a set of parameters associated with the request to dynamically generate at least one data script and determine one or more required data attributes associated with the request. The system further includes a processor coupled to the AI engine enabling the processor to identify positioning of the data attributes in a contract and creating a contract template for execution; and a recommendation engine coupled to the processor and a crawler to identify risk associated with at least one change in the contract template wherein in response to receipt of changes in the contract template from one or more entities the crawler identifies and processes the changes through the bot for determining an action to be performed.

In an embodiment, the system of the present invention includes a data extraction and mapping module with optical character recognition to extract at least one data attribute from a data object wherein the extracted data attribute is processed to obtaining text data for validation through an AI based data validation engine.

In an embodiment the system of the present invention includes a data attribute library configured for enabling comparison of the extracted data attribute with the library to detect presence or absence of certain attributes and deviations from a standard contract template in the library wherein the deviations are analyzed to generate a risk score for quantifying the risk involved for an entity on enforcing a contract.

In an embodiment, the AI engine coupled to the processor dynamically accesses or reconfigures the data attribute/contract term library of contract terms stored in the historical contract database to manage data attributes. Also, the AI engine processes at least one prediction algorithm to generate the data script in real time, where bot creates the data script based on one or more data models associated with the data attributes.

In an embodiment the system of the invention includes a KPI data monitoring engine configured to ensure performance of obligations under the data attributes of a contract by extracting at least one KPI data by structured based optical character recognition where a table in the data object is extracted and the KPI data is obtained for processing. The engine determines a productivity/reliability score for the entity based on the extracted KPI data, where the entity specific contract database enables processing of the contract data and an aggregated KPI data associated with the entity to generate a productivity/reliability score for the entity.

In an embodiment, the present invention includes a blockchain based contract management system. The blockchain based system includes a plurality of linked data blocks forming a blockchain with multiple branches configured for storing details of a plurality of executed contracts wherein the data blocks include information related to one or more data attributes associated with specific scenarios relevant to contracts. The system includes one or more data models associated with each block and configured for processing the data attributes based on identified risk data models stored in the blocks, at least one authentication module each associated with the data blocks configured for authenticating an action carried out by an entity related to the data block wherein in response to receipt of changes in a contract template from one or more entities, a crawler identifies and processes the changes through a bot for determining the action to be performed.

In an embodiment, the present invention provides a computer program product for Contract management. The product includes a computer readable storage medium readable by a processor and storing instructions for execution by the processor for performing the method of contract management.

In an advantageous aspect, the present invention utilizes Machine Learning algorithms and advanced text, sentence relation algorithms.

BRIEF DESCRIPTION OF THE DRAWINGS

The disclosure will be better understood and when consideration is given to the drawings and the detailed description which follows. Such description makes reference to the annexed drawings wherein:

FIG. 6 is example of data elements extracted from data attributes of a contract data in accordance with an embodiment of the invention.

FIG. 7 is example of data attribute extraction from a contract data in accordance with an embodiment of the invention.

FIG. 10 is a data model depicting sentence encoder in accordance with an embodiment of the invention.

FIG. 11 is a data attribute deviation example in accordance with an embodiment of the invention.

DETAILED DESCRIPTION

Figure 1:
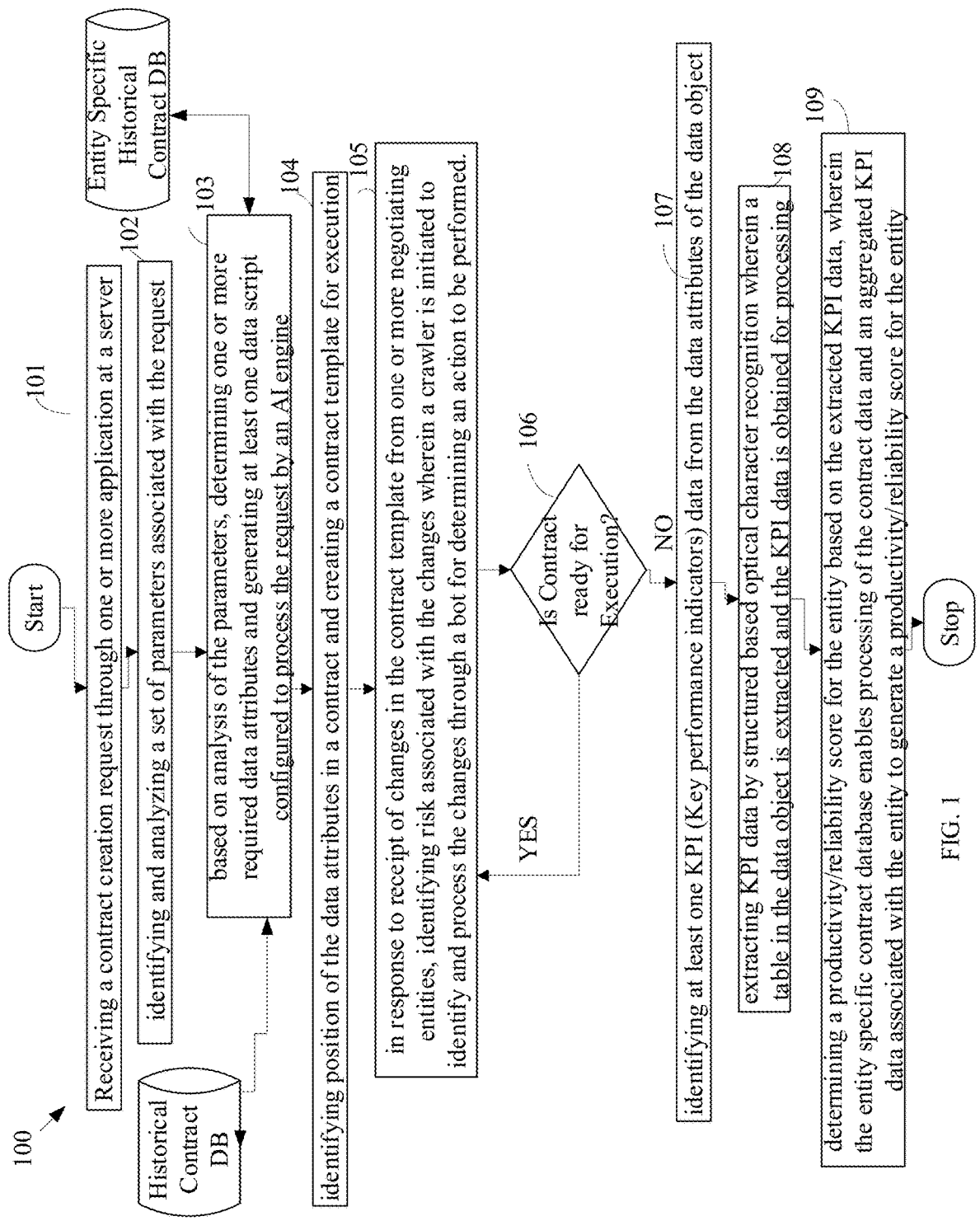
FIG. 1 is a flowchart depicting a method of contract management in accordance with an embodiment of the invention.

Described herein are the various embodiments of the present invention, which includes a method and a system of contract lifecycle management.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to"

another element or layer, it can be directly on, connected to, or coupled to the other element or layer or intervening elements or layers that may be present. As used herein, the term "and/or" includes any and all combinations of one or more of the associated listed items.

Spatially relative terms, such as "data attributes," "data elements," or "text," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to a system and method for contract management with multiple integrated tools configured for extracting data attributes with confidence score while working on many enterprise applications for contract management.

Referring to FIG. 1, a flowchart 100 depicting a method of contract management is provided in accordance with an embodiment of the present invention. The method includes the steps of 101 receive a contract creation request through one or more application at a server. In step 102 identify and analyze a set of parameters associated with the request. In step 103 based on analysis of the parameters, determine one or more required data attributes and generate at least one data script configured for processing the request by an AI engine through a bot based on the parameters. The request is processed after fetching data from historical contract database and entity specific contract database depending on the analyzed parameters. In 104, identify position of the data attributes in a contract and create a contract template for execution, and in 105 in response to receipt of changes in the contract template from one or more negotiating entities, initiate a crawler to identify and process the changes through the bot for determining an action to be performed. The action includes acceptance, rejection or modification in data attributes by one or more negotiating entities. In step 106, checking if the contract is ready for execution, if no, then repeating step 105. If contract is ready for execution, then in step 107 identifying at least one KPI data from the data attributes of the executed contract. In step 108, extracting KPI data by structured based optical character recognition wherein a table in the data object is extracted and the KPI data is obtained for processing. In step 109, determine a productivity/reliability score for the entity based on the extracted KPI, wherein the entity specific contract database enables processing of the contract data and an aggregated KPI data associated with the entity to generate a productivity/reliability score for the entity.

In an embodiment the KPI include quality assurance of goods, delivery dates, price cards or any obligation to be fulfilled under the executed contract.

In an embodiment, the set of parameters include parameters that determine if the request is a request for renewal of an existing contract or creation of a new contract, if an entity as an existing entity or a new entity and determine a type of contract to be created based on nature of engagement. The parameters may include entity name, existing contract details, type of engagement as a vendor for a development project etc. It shall be understood to a person skilled in the art that the parameters may vary depending on the request and source of request like from an entity or auto generated request from an application after completion of an operation of the application.

In an embodiment, the invention includes processing the request by one or more entity specific data model or a contract specific data model or a switching data model configured to switch between the entity specific data model and contract specific data model.

Figure 1A:
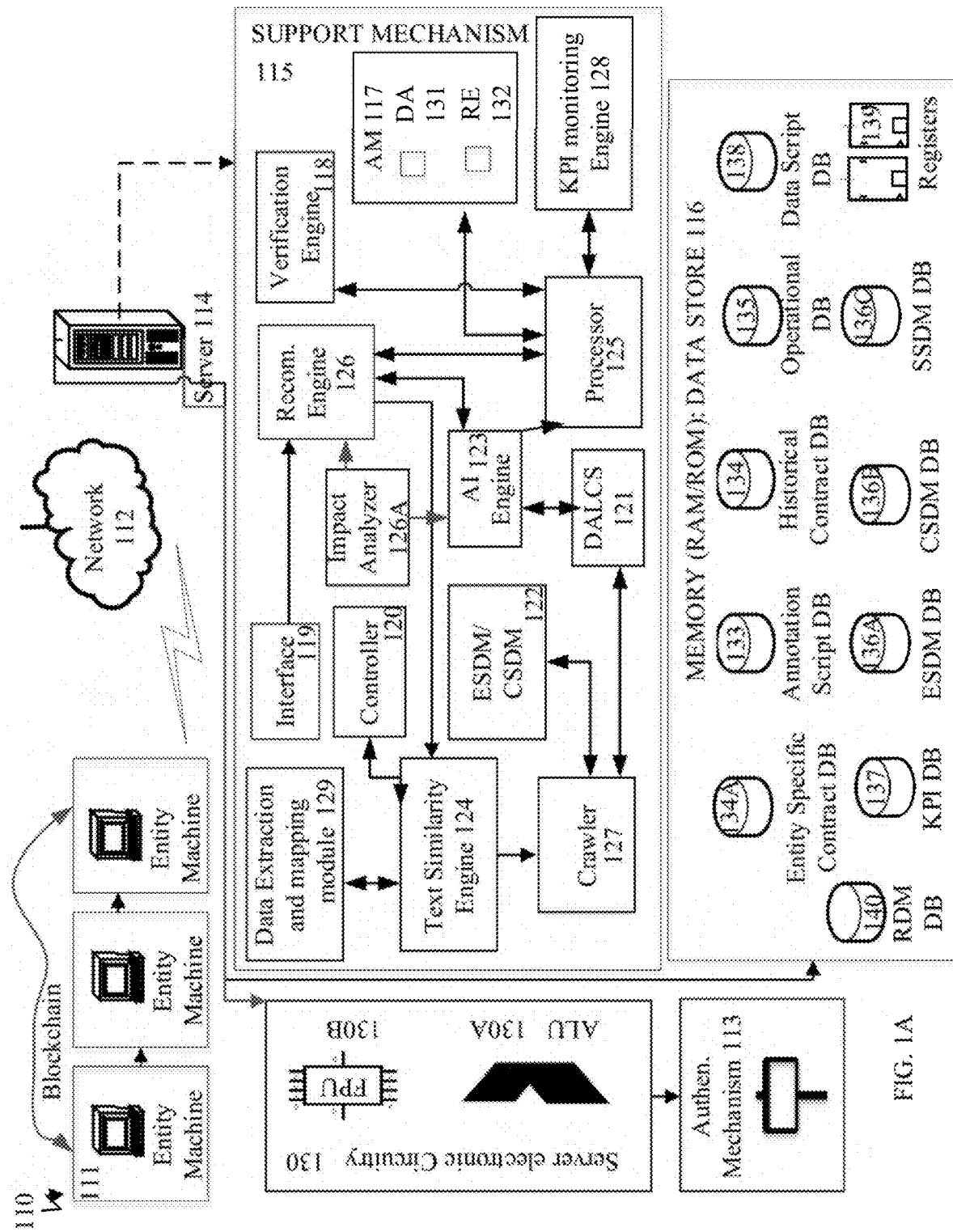
FIG. 1A is a view of a contract management system in accordance with an embodiment of the invention.

Referring to FIG. 1A, a system 110 for contract management is provided in accordance with an embodiment of the present invention. The system 110 includes at least one entity machine 111 for sending, receiving, modifying contract data over a network 112. The system includes a blockchain based contract management system with one or more entities connected to each other for creating a contract, negotiating a contract including redlining a contract etc. The system includes an authentication mechanism 113 based on blockchain to ensure each modification in a contract during negotiation is validated automatically, thereby saving time and increasing security. The system further includes a server 114 configured to receive the contract data from the entity. The system 110 includes a support mechanism 115 for performing contract data extraction, classification and structuring of data attributes depending upon the type of contract, the application or entity triggering initiation of contract creation request i.e registered or unregistered and the type of contract data received at the server 114. The system 110 includes a memory data store 116 for accessing contract data from registered and unregistered entity and also storing plurality of training classification models created by support mechanism 115. The system includes an annotation mechanism for annotation of legal terms of a contract based on an annotation script.

In an exemplary embodiment, the blockchain based contract management system and method enables distributed ledger to capture the acceptance from entities involved in the contract, authentication of sources and the contractual document which captures the legal text being agreed upon. Further, it also enables utilization of contract based on accumulated purchase order/invoice totals (those referring the contract)

In an embodiment the server 114 of the invention may include various sub-servers for communicating and processing data across the network. The sub-servers include but are not limited to content management server, application server, directory server, database server, mobile information server and real-time communication server.

In an embodiment the entity machine 111 may communicate with the server 114 wirelessly through communication interface, which may include digital signal processing circuitry. Also, the entity machine 111 may be implemented in a number of different forms, for example, as a smartphone, computer, personal digital assistant, or other similar devices.

In an example embodiment, the support mechanism 115 of the system 110 includes an interface 119 for accessing contract information received at the server 114. The support mechanism further includes a data attribute library creation script (DALCS) 121 that is updated each time a new data attribute for a contract is identified from a newly executed contract that is added to the data store 116 of the system 110. The support mechanism 115 includes a verification engine 118 for verifying/identifying if the contract request is received from an entity or triggered by the system after completion of an application function, includes known parties or entities. The mechanism 115 further includes a controller 120 encoded with instructions, enabling the controller 120 to function as a bot for contract management application operations. The mechanism 115 also includes an entity specific data model or contract specific data model generation (ESDM/CSDM) mechanism 122, an AI engine 123 configured for enabling generation of a data script depending on the data models of the model generation mechanism 122, a text similarity engine 124 for determining and quantifying deviations of data attributes in a contract template after comparison from the data attribute library creation script 121, a processor 125 configured for performing various functions including but not limited to selecting appropriate data attributes, identifying positioning of the data attributes, creating a contract template, a prediction and recommendation engine 126 coupled to the processor and a crawler 127 where in response to receipt of changes in the contract template from one or more entities the crawler 127 identifies and processes the changes through a bot for determining an action to be performed, a KPI monitoring engine 128 configured for monitoring KPI data attribute of each contract, a data extraction and mapping module 129 configured for extracting data from executed contract using optical character recognition technique.

In an exemplary embodiment, the AI engine 123 is coupled to the controller 120 encoded with instructions enabling the controller 120 to function as a bot for processing the request based on the parameters.

In example embodiment the server 114 shall include electronic circuitry 130 for enabling execution of various steps by the processor. The electronic circuity has various elements including but not limited to a plurality of arithmetic logic units (ALU) 130A and floating-point Units (FPU) 130B. The ALU enables processing of binary integers to assist in formation of at least one table of data attributes where the ESDM and CSDM are applied to the data table for obtaining accuracy score of contract data in the contract template. In an example embodiment the server electronic circuitry 130 as shown in FIG. 1A, includes at least one Athematic logic unit (ALU) 130A, floating point units (FPU) 130B, other processors, memory, storage devices, high-speed interfaces connected through buses for connecting to memory and high-speed expansion ports, and a low speed interface connecting to low speed bus and storage device. Each of the components of the electronic circuitry 130, are interconnected using various busses, and may be mounted on a common motherboard or in other manners as appropriate. The processor can process instructions for execution within the server 114, including instructions stored in the memory or on the storage devices to display graphical information for a GUI on an external input/output device, such as display coupled to high speed interface. In other implementations, multiple processors and/or multiple busses may be used, as appropriate, along with multiple memories and types of memory. Also, multiple servers may be connected, with each server providing portions of the necessary operations (e.g., as a server bank, a group of blade servers, or a multi-processor system).

The processor 125 may be implemented as a chipset of chips that include separate and multiple analog and digital processors. The processor 125 may provide coordination of the other components, such as controlling user interfaces, applications run by devices, and wireless communication by devices.

The Processor 125 may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user and convert them for submission to the processor. In addition, an external interface may be provided in communication with processor 125, so as to enable near area communication of device with other devices. External interface may provide, for example, for wired communication in some implementations, or for wireless communication in other implementations, and multiple interfaces may also be used.

Referring to FIG. 1A, the various elements like the support mechanism 115, the memory data store 116, the annotation mechanism (AM) 117 are shown as external connections to the server 114 in accordance with an embodiment of the invention. However, it shall be apparent to a person skilled in the art that these elements may be part to an integrated server system. Also, some of the sub-elements of the support mechanism 115, the memory data store 116 and the annotation mechanism 117 either alone or in various combinations may be part of a server system as other external connections.

In an embodiment, the annotation mechanism 117 includes a data analyzer (DA) 131 and a rule engine (RE) 132. The data analyzer 131 is configured for analyzing one or more text data surrounding at least one data element to be extracted from a data object. The data attributes are the clauses of a contract that are extracted by executing a sentence level segmentation of the data object and classification of each sentence int a data attribute category like indemnification clause, confidentiality clause, definition, force majeure etc. The analyzer is configured for performing the function as per the requirement of the system to obtain the desired result.

In an example embodiment, the memory data store 116 includes plurality of databases as shown in FIG. 1A. The data store 116 includes an annotation script database 133 storing a plurality of annotation script relevant to the data attribute of the contract template for extracting contract data from historical contract database 134, the historical contract database 134 stores contract data from one or more entities, an entity specific historical contract database 134A configured for storing information about past executed contracts of an entity for reference, an operational database 135 configured for storing a set of parameters identified from a received contract creation request, a plurality of data model database including an entity specific data model (ESDM) database 136A, a contract specific data model (CSDM) database 136B and at least one switching script data model database (SSDM) 136C, configured for storing a plurality of training data models required to fetch data attributes for creating the contract template, a key performance indicator (KPI) database 137 for storing information about key performance indicators of related contracts stored in the historical contract database 134 to ensure performance of the contract at all times, a data script database 138 configured for storing a plurality of data script generated by the AI engine based on analysis of the received contract creation request. The data script is generated based on prediction analysis, and deep learning performed on historical contract database 134 and entity specific historical contract database 134A. The data script includes a set of queries processed by dynamically generated AI based processing logic. The data store further includes a plurality of registers 139 as part of the memory data store 116 for temporarily storing data from various databases to enable transfer of data by a processor between the databases as per the instructions of the AI engine 123 to create a contract with data attributes and obtain confidence score of the data attributes.

In an embodiment, the processing logic for is sequential or parallel or switching based processing of the data attributes for generating the data script to ensure faster processing of the request. The switching-based processing logic includes dynamic identification of a path for processing of the request based on the data script and determination of multiple data attributes dependent on each other in a contract.

In an embodiment, the entity specific data model is generated by analyzing the plurality of contract data from the entity specific historical contract database 134A wherein the database 134A includes the plurality of contract data extracted after optical character recognition of past executed contracts by the entity.

In an embodiment, the contract specific data model is generated by analyzing the plurality of contract data from the historical contract database 134 where the database 134 includes the plurality of contract data extracted after optical character recognition of past executed contracts by one or more entities.

In an embodiment, the system identifies risk associated with clauses in the contract based on one or more risk-identification data model stored in a risk data model (RDM) database 140 where the risk is identified every time the changes to data attributes are received from the one or more entities. The one or more risk identification data model is trained through deep learning, feedback mechanism, natural language processing of contract data. Further, the one or more risk identification data model utilizes natural language processing of historical data related to contracts stored in a historical contract database. The prediction and recommendation engine 126 processes identified risk associated with clauses to recommend modifications to these clauses based on risk scores after processing of information in the historical contract databases 134.

In an exemplary embodiment, the recommendation engine 126 identify risk associated with changes in clauses and also risk clauses in a contract. The engine identifies category of clauses identified as risky.

In an example embodiment, the identification of risk associated with data attributes/clauses or changes within the clauses requires processing of a plurality of information associated with changes. If an entity does not share data with applications built on certain software environment or category of application building tools, then a modification in data attribute/clause of the contract template suggesting use of those building tools by the enterprise application needs to be processed through AI and bots. The recommendation engine would modify the clause related to those categories of application building tools to include a comment mentioning insufficient information and seek more information about the types of building tools. Alternately, if the tools are explicitly specified in the contract then the AI engine would scan the list of the tools to identify if they are under the permissible tools, else would reject any feature built with a non-acceptable open source tool. Again, an Enterprise application (EA) would support multiple features built with different tools for coding at the back end. The features build from such tools that may be unacceptable would be rejected. For, this level of processing, the system requires training of the data models with higher accuracy and confidence score to make changes to the contract. The data extraction process of the present invention and specific scripts generated through the contract management system enables processing of such information and considerably reduced the risks for the entities.

In an exemplary embodiment, the system of the present invention includes an impact analyzer 126A to evaluate impact of changes in one data attribute on other data elements or data attributes of the data object/contract. In case of change in data attribute related to scope of work, the data attribute related to financial terms would also be impacted. The system would recommend such impacted data attributes for changes as the AI engine processes relation of data attributes that are connected through graphical data model. Moreover, the system would recommend modification to the financial terms in the price sheet of the Contract based on analysis of past executed Contract where the entity had proposed different financial numbers. The system may recommend a minimum and a maximum value agreed for the scope of work in the past executed contracts.

In an embodiment, the system includes a record script configured for identifying contracts from the historical Contract database wherein the data attribute has been executed along with category of those contracts as standard or non-standard thereby enabling faster processing of request.

In an example embodiment, the contract creation request is auto generated based on expiry of previous contract or completion of an enterprise application (EA) including supply chain management (SCM) application operation/task thereby leading to contract creation.

The memory data store 116 may be a volatile, a non-volatile memory or memory may also be another form of computer-readable medium, such as a magnetic or optical disk.

The memory store 116 may also include storage device capable of providing mass storage. In one implementation, the storage device may be or contain a computer-readable medium, such as a floppy disk device, a hard disk device, an optical disk device, or a tape device, a flash memory or other similar solid-state memory device, or an array of devices, including devices in a storage area network or other configurations.

In an embodiment, data attributes are extracted from data objects by a data extraction process. The extracted data attributes are compared with a contract data attribute library to detect presence or absence of certain attributes and deviations from a standard contract template in the library wherein the deviations are analyzed to generate a risk score for quantifying the risk involved for an entity on enforcing a contract.

The computing devices referred to as the entity machine, server, processor etc. of the present invention are intended to represent various forms of digital computers, such as laptops, desktops, workstations, personal digital assistants, and other appropriate computers. Computing device of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

In an embodiment, the system is provided in a cloud or cloud-based computing environment. The blockchain based contract management system enables more secured process considering the issues inherent with cloud environments.

In an embodiment, the entity includes a supplier, a client, one or more operation of an Enterprise application automatically generating the request based on execution of the operation like Purchase order, expiry of an existing contract, sourcing request or occurrence of any such operation triggering the application to generate the request.

Figure 2:
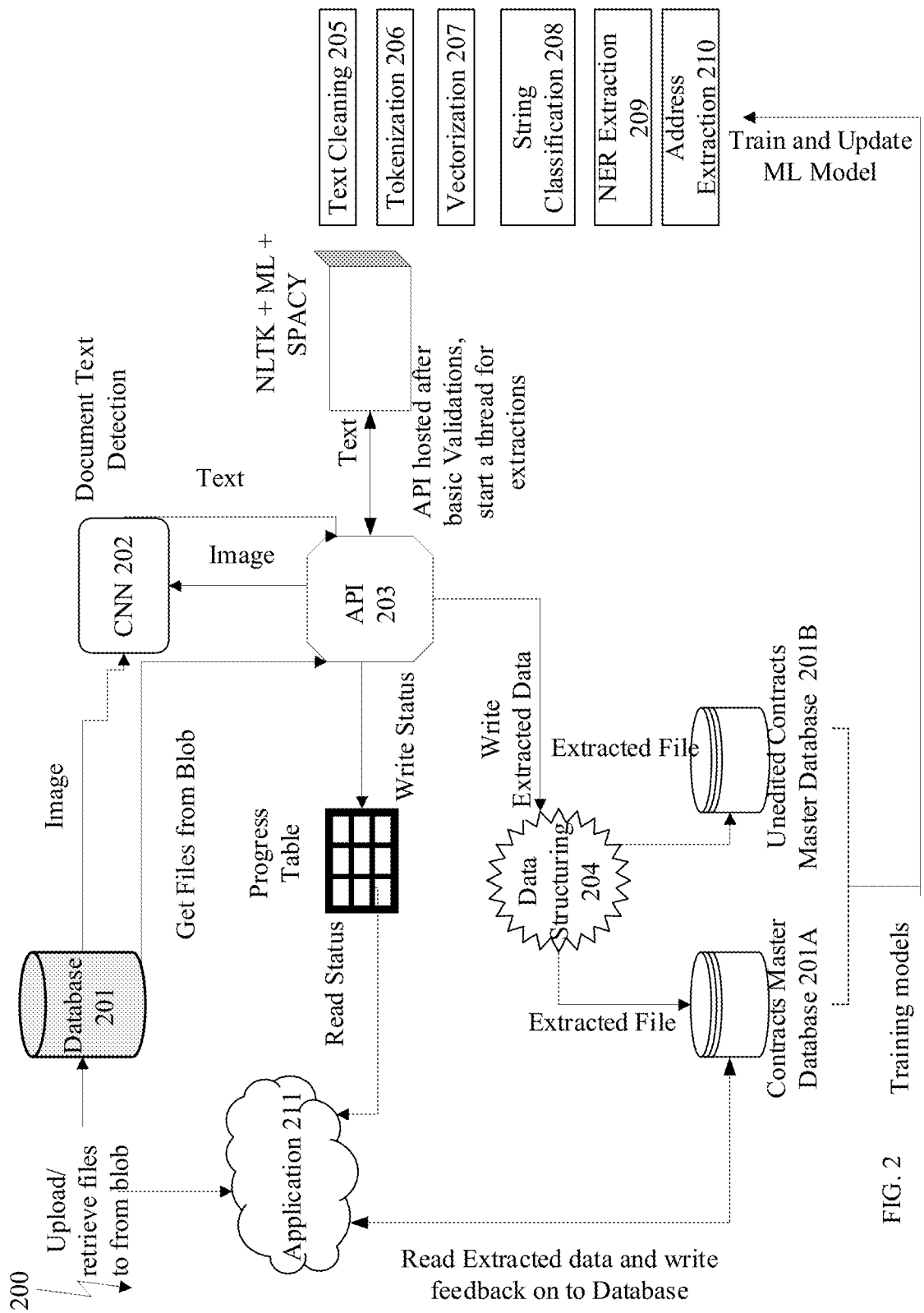
FIG. 2 is an architecture of the contract management system with data cleansing and classifier in accordance with an embodiment of the invention.

Referring to FIG. 2, a contract management system architecture 200 is shown in an example embodiment of the invention. The architecture 200 includes databases (201, 201A, 201A), convolutional neural network (CNN) 202, attribute and element extraction API 203, data structuring block 204 for data extraction and training models to perform text cleansing 205, tokenization 206, vectorization 207, string classification 208, NER extraction 209, and element extraction 210 etc. The architecture enables performance of read/write extracted data attributes and data elements from the contract for training models and creating contracts through application 211.

Figure 2A:
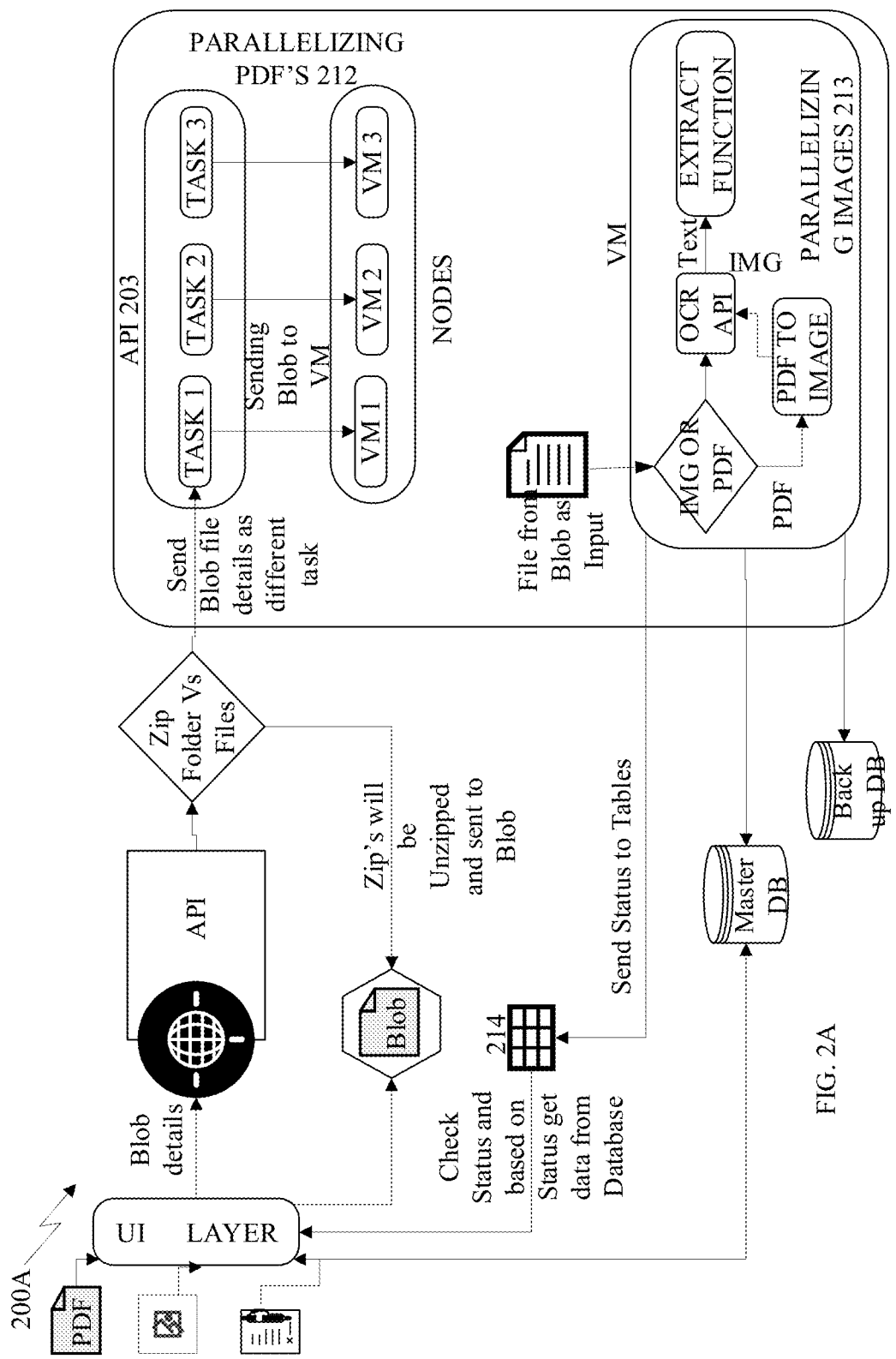
FIG. 2A is a view of an architecture for parallelization of contracts in accordance with an embodiment of the invention.

Referring to FIG. 2A, an architecture 200A for parallelization of contracts is provided in accordance with an embodiment of the invention. The architecture 200A includes API 203, a plurality of tasks/data extraction are done through parallelization of PDF's 204 and parallelization of Images 205. The status of data extraction is sent to tables 214.

Figure 3:
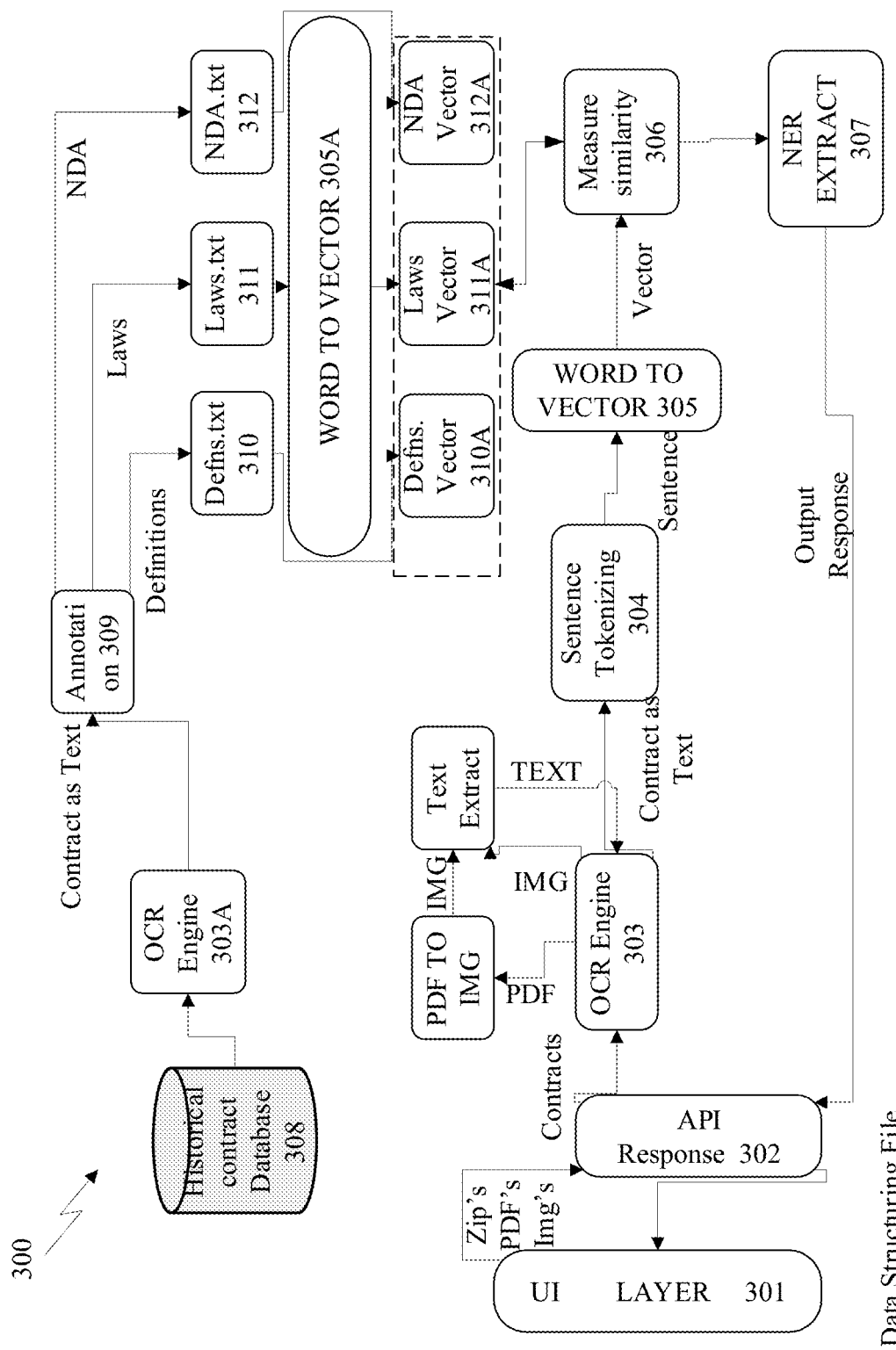
FIG. 3 is a view of a data flow architecture of data extraction through optical character recognition and word to vector conversion for measuring similarity in accordance with an embodiment of the invention.

Referring to FIG. 3, a detailed view of a data flow architecture 300 of data extraction through optical character recognition in a contract management framework is provided in accordance with an embodiment of the invention. The architecture details an UI layer 301 and an API for fetching contract text. The architecture 300 includes data an OCR engine 303 for converting a data object into text. The converted text is sent to sentence tokenization through tokenizing block 304. The architecture includes word to vector convertor 305 for converting tokenized sentences to vectors and then a similarity measurement block 306 measures similarity of these vectors with reference vectors and assign entities to sentence/string. The reference vectors are obtained after contract data is fetched from historical contract database 308 and converted to text through OCR engine 303A. The present invention deploys a data extraction and mapping module that retains structure of the text in the data object/document. The data structure includes retaining the font size of the text to detect section headings and spacing between lines to detect paragraphs in the contract text. This is used to render the extracted text in a text editor. This ensures accurate and easier editing and traversal through the data object by using the section headers as a link. The architecture includes annotation engine 309 that utilizes converted text to identify clause categories like Definition 310, law text 311 or contract types like NDA 312 or clause categories. The architecture then deploys word to vector convertor 305A for obtaining definition vector 310A, law text vector 311A and NDA vector 312A. These vectors are reference vectors to enable measurement of similarity and assign entities to sentences/strings through the similarity measurement block 306.

In an embodiment, the extracted data attributes are compared with a contract data attribute library to detect presence or absence of certain attributes and deviations from a standard contract template in the library wherein the deviations are analyzed to generate a risk score for quantifying the risk involved for an entity on enforcing a contract.

In an embodiment, one or more data elements of the data object are extracted by processing one or more text surrounding the data elements. The data elements may be any data element of a contract enabling entity level analysis. The data element may include contract start date, end date, supplier name, and other elements of interest. These elements are extracted by modelling the problem as named entity recognition (NER) through NER extraction block 307 where words/tokens corresponding to a specific element are extracted by processing one or more text surrounding the element.

In another embodiment, the data attributes are clauses of a contract. The data attributes are extracted by executing a sentence level segmentation of the data object and classification of each sentence into a data attribute category.

Figure 4:
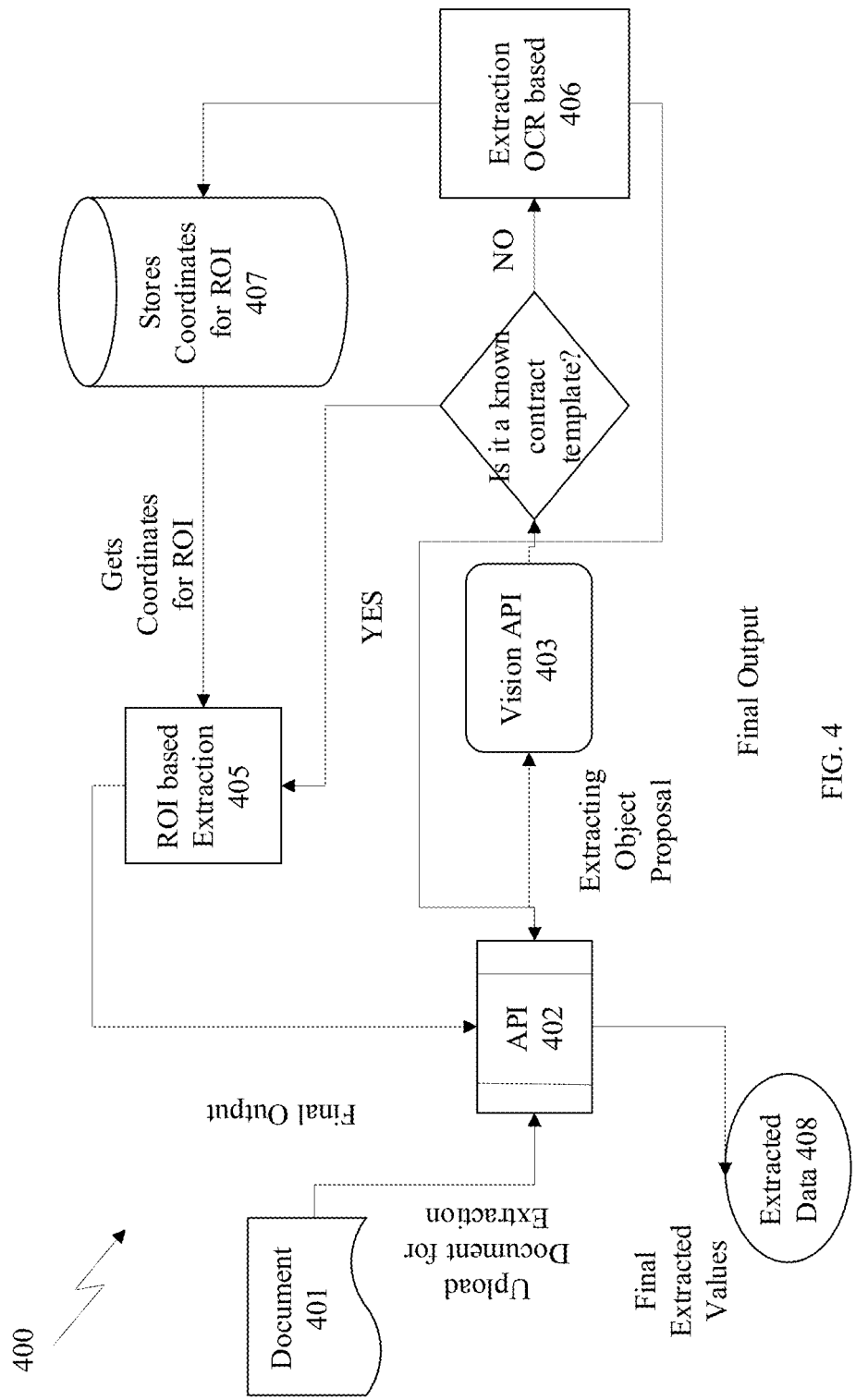
FIG. 4 is an example data extraction flow diagram depicting extraction of data from a data object through OCR in accordance with an embodiment of the invention.

Referring to FIG. 4, an example data extraction flow diagram 400 is shown in accordance with an embodiment of the invention. The contract document 401 is uploaded for extraction. The document is fetched by an API 402 and sent to Vision API 403 for extraction. In 404 it is determined if the document is a known template, if yes then a region of interest (ROI) 405 in the contract is identified for extraction of required contract data, else optical character recognition (OCR) based extraction of the unknown contract template is performed for extraction of data through OCR block 406. The learnings of the unknown contract template after extraction are utilized by storing ROI coordinates in a database 407 and passed on to ROI block 405. The API 402 provides the extracted data 408 to get final extracted values and stores it in historical contract database.

Figure 4A:
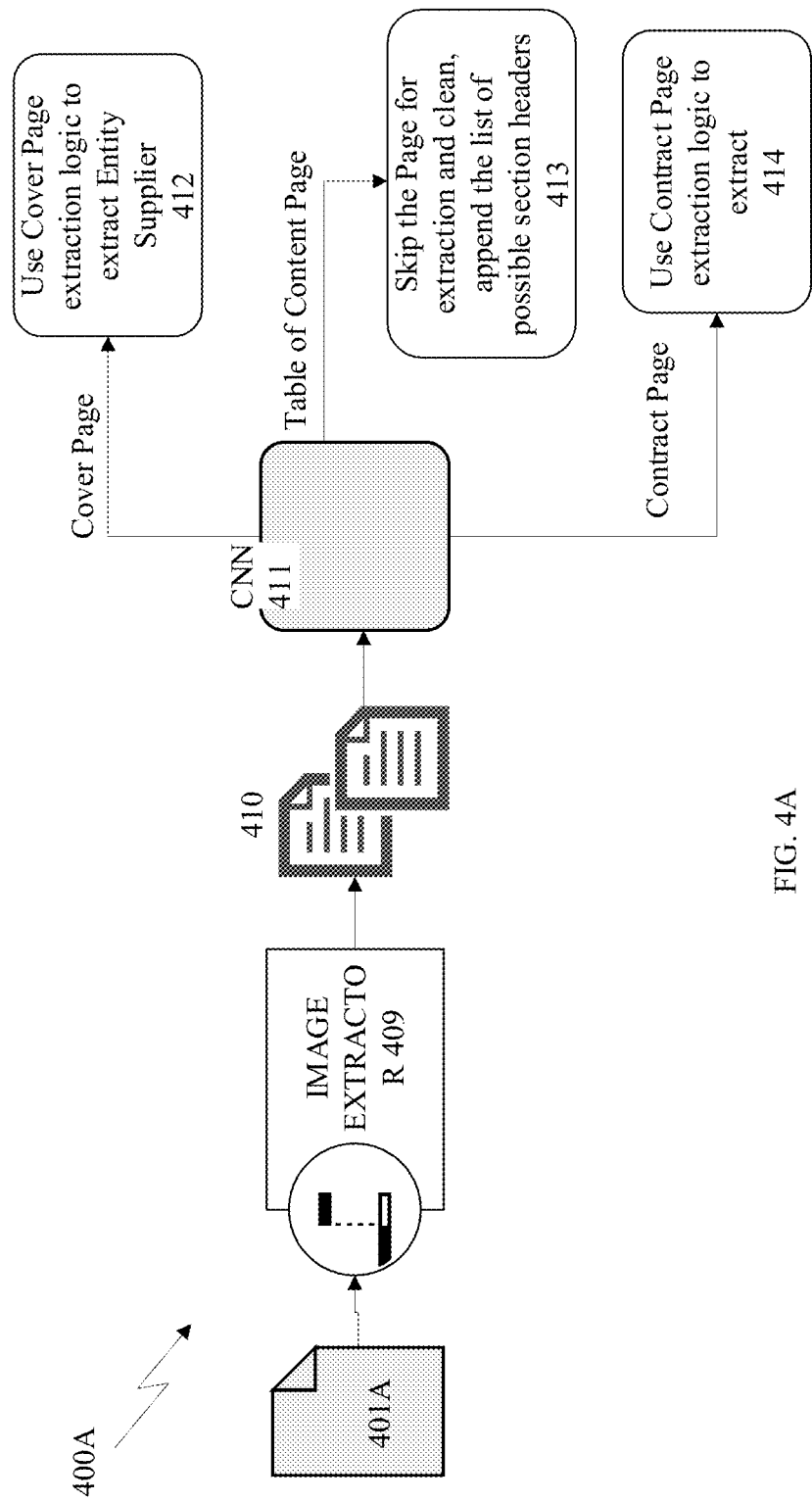
FIG. 4A is an example flow diagram of table extraction from images of the data object in accordance with an embodiment of the invention.

In an embodiment, the vision API performs table extraction from images of the data object as depicted from the flow diagram 400A shown in FIG. 4A. Tables within a contract contain important information such as the pricing of the goods or services procured within the contract. Tables are extracted from the contract in a two-step process. Firstly, the pages of a scanned document 401A are converted into images through an image extractor 409 and passed through a convolutional neural network CNN based binary classifier 410. The classifier 410 detects pages that contain a table in it and table extraction is applied to these table pages. The table extraction algorithm deploys data transform to extract the horizontal and vertical lines present in the image. The intersections of horizontal and vertical lines are used to detect cells present in the table. The text within the cells are then processed to obtain a machine-readable table. The cover page extraction 411 deploys Use of Cover Page extraction logic to extract say an entity supplier. For the table of content page 412 Skip the Page for extraction and clean, append the list of possible section headers. For contract page extraction 413 contract Page extraction logic is deployed for extraction. Further, downstream tasks can be applied to these tasks to obtain key-value pairs such as the name of the product and its corresponding price.

Figure 5A:
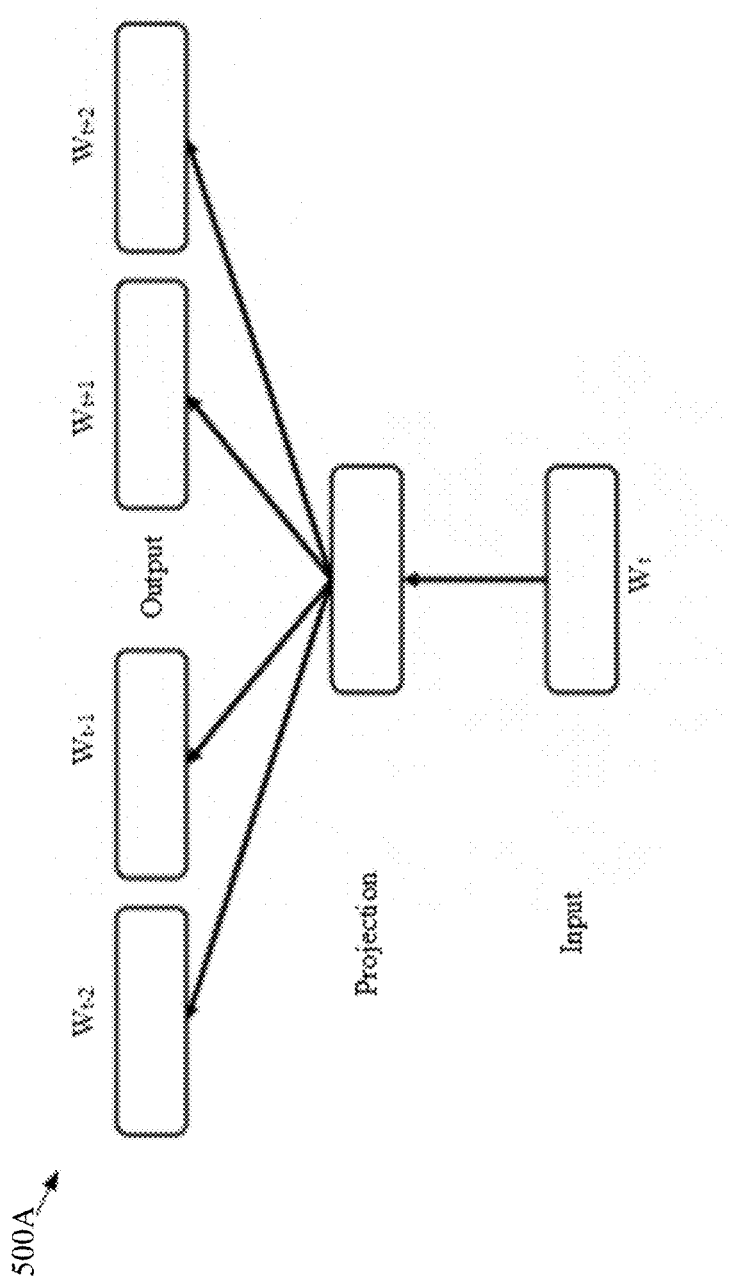
FIG. 5A shows a model used to train custom word embedding over the data descriptions where a current word vector is sent through a projection to predict word embedding vectors of surrounding words under a skip-gram model in accordance with an embodiment of the invention.
Figure 5B:
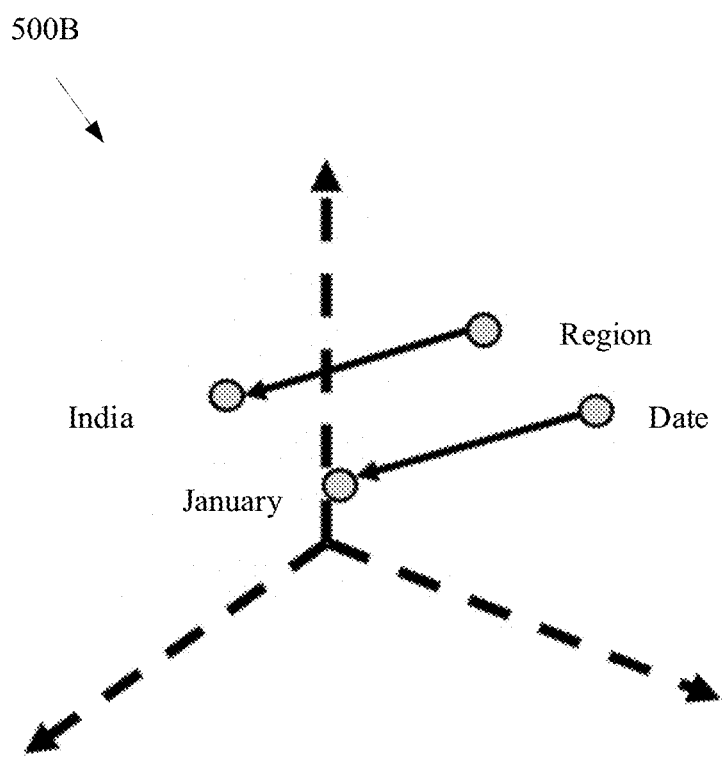
FIG. 5B shows an intuitive diagram of word embeddings where the semantic relationship is encoded in the embedding space in the form of similar vectors as an example in accordance with an embodiment of the invention.

Referring to FIGS. 5A and 5B, provide skip-gram model 500A and intuitive diagram 500B of word embeddings is shown in accordance with an example embodiment of the invention. As an example, the semantic relationship of a region 501 is to India as date 503 or month is to January is encoded in the embedding space in the form of similar vectors. The extraction of contract text using OCR is followed by several downstream tasks that rely on the use of Natural Language Processing (NLP) with deep learning algorithms. A word or token is an atomic unit in text processing, and it is mapped to a feature space that captures its semantic and syntactic meaning. This achieved by training word embeddings where each word is mapped to a vector of dimension D. This D-dimensional embedding space captures the relationship between different words in the vocabulary. The word embeddings are trained using the fast text framework that relies on the skip-gram model

500A. In a skip-gram model 500A, the word embedding of a token is mapped through a transformation to predict the word embedding vectors of its surrounding tokens:

$$\mathcal{L}_{skip-gram} = \sum_{n=0}^{N} \sum_{c \in C_n} \log(p(w_c | w_n))$$

where $L_{skip-gram}$ is the loss function used to train the word embeddings, context $C_n$ with words $w_c$ is the set of indices for words surrounding the target word wn. Fast-text also models each word by using character n-grams. For the training of embeddings all n-grams are extracted for n>=3 and n<6. Each n-gram is associated with a vector $u_g$, leading to the following scoring function is:

$$s(w, C_w) = \sum_{g \in G_w} u_g^T v_{c_w}$$

where $G_w$ with n-grams g are the set of n-grams per word w, $C_w$ is the context for the word w. This is crucial to capture the subtle differences between words having either the same suffix or prefix. The vocabulary and training corpus for word embeddings is obtained by using the text present in the historical contract database. This is to ensure that the word embedding space is specific to contract text i.e. it captures the grammatical structure and semantic meaning of words, sentences present in legal contract text.

Figure 6A:
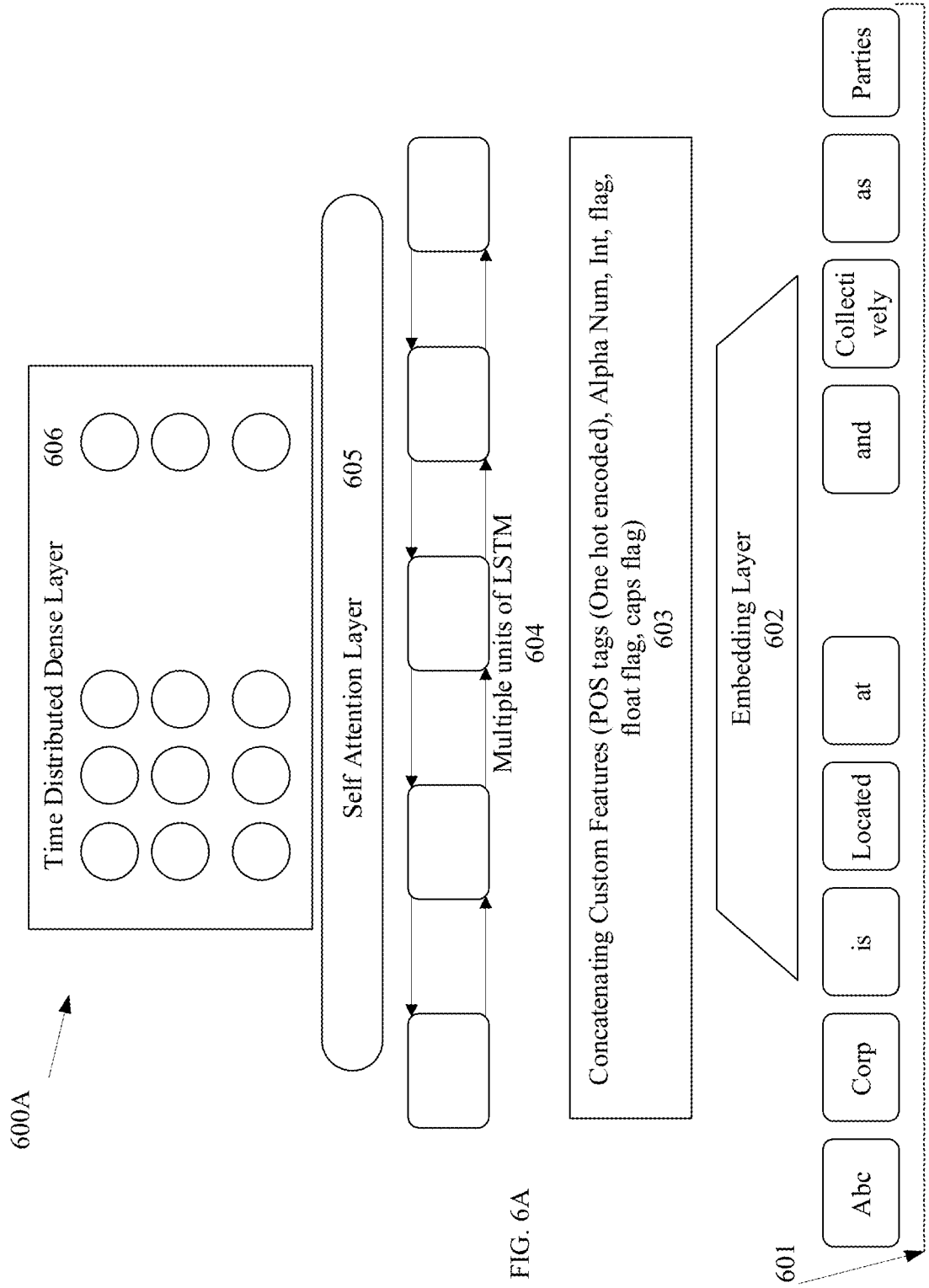
FIG. 6A is a model for data elements extraction in accordance with an embodiment of the invention.

Referring to FIGS. 6 and 6A, a table 600 and a model 600A for data element extraction is shown in accordance with example embodiments of the invention. Since, a contract can have several data elements of interest such as the start date, end date, supplier name and address. Such a data element is typically present within the contract text and can be extracted based on its context obtained from the surrounding text. The automatic extraction of such elements saves a lot of time and decreases the average processing time of contracts. There are certain elements which are common to all entities and approached using the same algorithm. However, there could also be data elements which are specific to a certain entity depending on their operational needs.

In an example embodiment, the data model enables extraction of contract data elements using machine learning. This is formulated as Named entity recognition (NER) where input is parts-of-speech (POS) tagging 603 and each token 601 in the text is given one of three tags BIO i.e. B for beginning, I for in between and O for outside. The first token corresponding to the data element is given a B tag, the remaining element tokens are given a "I" tag and all the remaining non-attribute tokens are given the O tag. A recurrent neural network (RNN) is implemented to perform the BIO tagging. The input to the network is a sequence of tokens 601 and the output is a sequence of BIO tags with one tag corresponding to one token. The RNN model contains an embedding layer 602 that maps the vocabulary index of a token to an embedding vector. The sequence of embedding vectors is then input to a bidirectional long-short-term memory (LSTM) layer 604 which encodes the surrounding context of each token as output. An LSTM layer is an RNN that encodes a hidden context by parsing through a sequence of vector inputs:

$$h_t = f(W^{(hh)} h_{t-1} + W^{(hx)} x_t)$$

$$y\_t = g(W^{(hy)} h_t)$$

where $y_t$ is the output vector of the LSTM provided as input to the higher layers in the model and functions f, g, encode the hidden context of the RNN $h_t$ and the output of the RNN layer $y_t$. The parameters $W^{(hh)}$, $W^{(hx)}$, $W^{(hy)}$ are the corresponding weights for the inputs $h_{t-1}$, $x_t$, $h_t$. The output of Bi-LSTM 604 is then passed through a self-attention layer 605 to a time distributed dense layer 606 for further encoding and finally passed through a soft-max layer to output a sequence of probability distributions over the three candidate tags. The probability distribution p with the probability of a category, i, obtained by the softmax operation over the model logits $z_i$:

$$y_i = \frac{e^{z_i}}{\sum_j e^{z_j}}$$

A tag is assigned to each token that has the maximum probability assigned to it. The BIO tagging is performed per data element required by the entity. The model is trained using a categorical cross entropy (CE) as the loss function. The target probability distribution used as an input for cross entropy loss is a one-hot encoded vector t with a probability of 1 for the desired category and the probability distribution y is output by the softmax layer. The CE $L_{element}$ loss over M categories given by:

$$\mathcal{L}_{element} = -\sum_{n=0}^{N} t_i \log(y_i)$$

Each element has a characteristic training dataset where the surrounding context to extract an element like starting date is very different from the context for extracting supplier address. Each of this element extraction can be treated as a subtask. The collection of all data element extractions is treated as a multi-task learning framework where the same model architecture could adapt to different data elements.

Figure 7A:
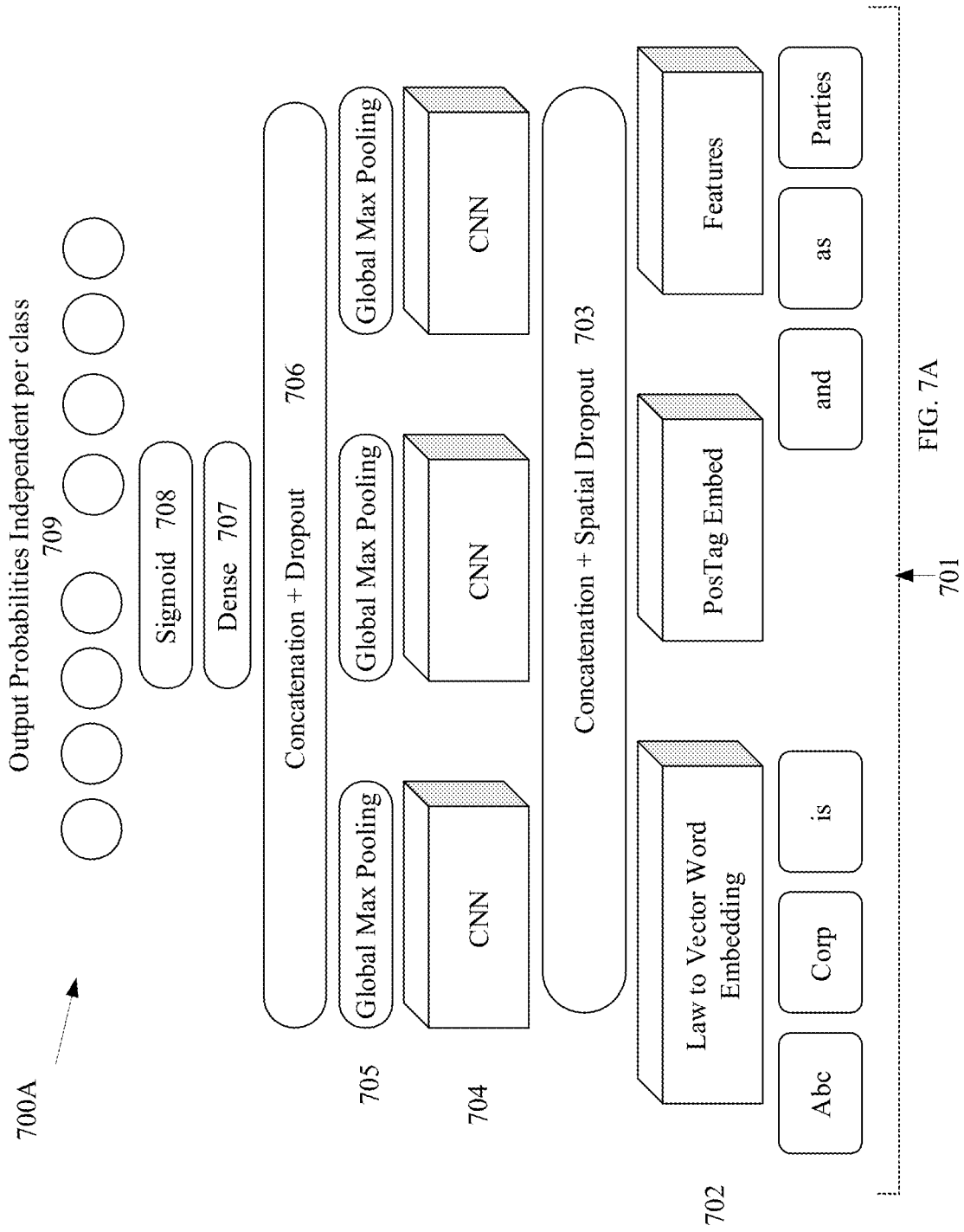
FIG. 7A is a data model depicting data attribute extraction from a contract data in accordance with an embodiment of the invention.

Referring to FIG. 7 and FIG. 7A, a table 700 and a data model 700A depicting example of data attribute extraction are provided in accordance with embodiments of the invention. The data attributes or clauses determine the legal liabilities and risk associated to an entity. There can be different types of clauses such as confidentiality, termination, indemnification, jurisdiction related clause that entails to the legal jurisdiction which would apply in the event of a legal dispute between the contracting entities. The data attribute extraction for generating a contract template is extremely essential to ensure the contract is suitable to all entities party to the Contract. The contract management system of the invention performs extensive data attribute/clause analysis using machine learning. The various tasks implemented for clause analysis include the extraction of clause text from the entire contract text, classification of each attribute/clause into one of the Attribute categories such as Jurisdiction and the detection of the presence or absence of certain template clauses that are required by an entity to be present in the contract.

The data model 700A of the data attribute extraction includes tokens 701, embedding layer 702 with law to vector embedding, PosTag (Part-of Speech tag) embedding and feature blocks. The model also includes a first concatenation and spatial dropout layer 703, and plurality of CNN (convolution neural network) blocks 704, a plurality of global max pooling block 705, a second concatenation and dropout layer 706, a dense layer 707, a sigmoid layer 708, and output probabilities independent per class 709. One-dimensional convolutions are performed on the sequence of word embedding vectors provided as inputs. Each convolutional operation is referred to as a filter h and has filter width w. The one-dimensional convolution operation for a word sequence f is given by:

$$(f*h)(m) = \sum_{i=0}^{w} h[i]f[m-i]$$

The preliminary step to contract data attribute or text analysis is the extraction and classification of clauses present in the contract text. Sentence segmentation is applied to the contract text and the clause classification is applied at the sentence level. This is implemented using the convolutional neural network (CNN) 704 based text classifier. The input to the text classifier is a sequence of tokens 701 corresponding to a single sentence. The tokens 701 are passed through an embedding layer 702 to obtain word embedding vectors per token. The sequence of word embeddings is passed through multiple CNN layers 704 where trigram, five-grams and seven-grams within the sequence are passed through filters to encode characteristic utterances that are specific to each data attribute/clause category. The output of the plurality of CNN layers 704 are passed through max pooling layers 705 to obtain tokens with importance and the final output is through a sigmoid layer 708 where the output is collection of multiple independent probabilities 709 corresponding to each data attribute/clause category. The final label assignment is based on a probability threshold of each clause and could also result in multiple labels. This is a multi-headed output where the same sentence could belong to two different clause categories such as Confidentiality and Jurisdiction.

Figure 8:
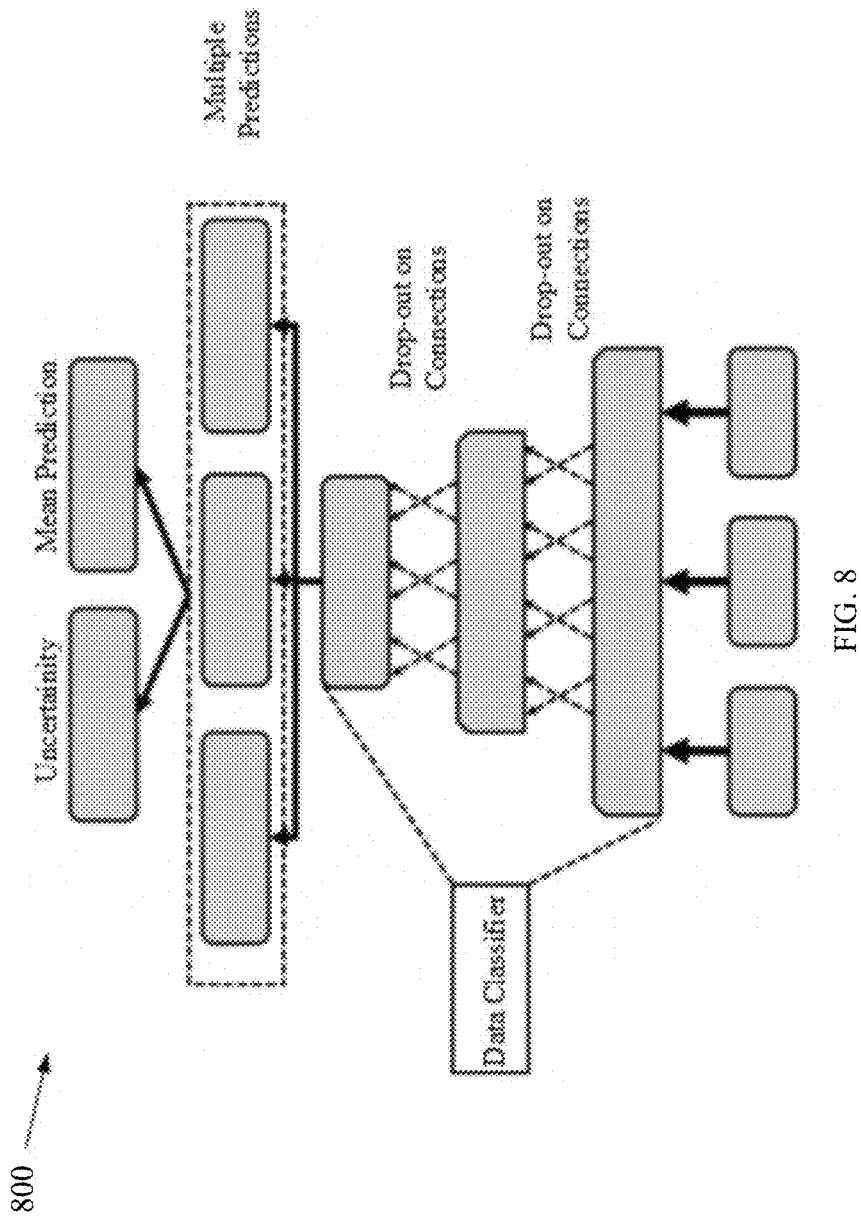
FIG. 8 is an uncertainty model for confidence score generation in accordance with an embodiment of the invention.
Figure 9:
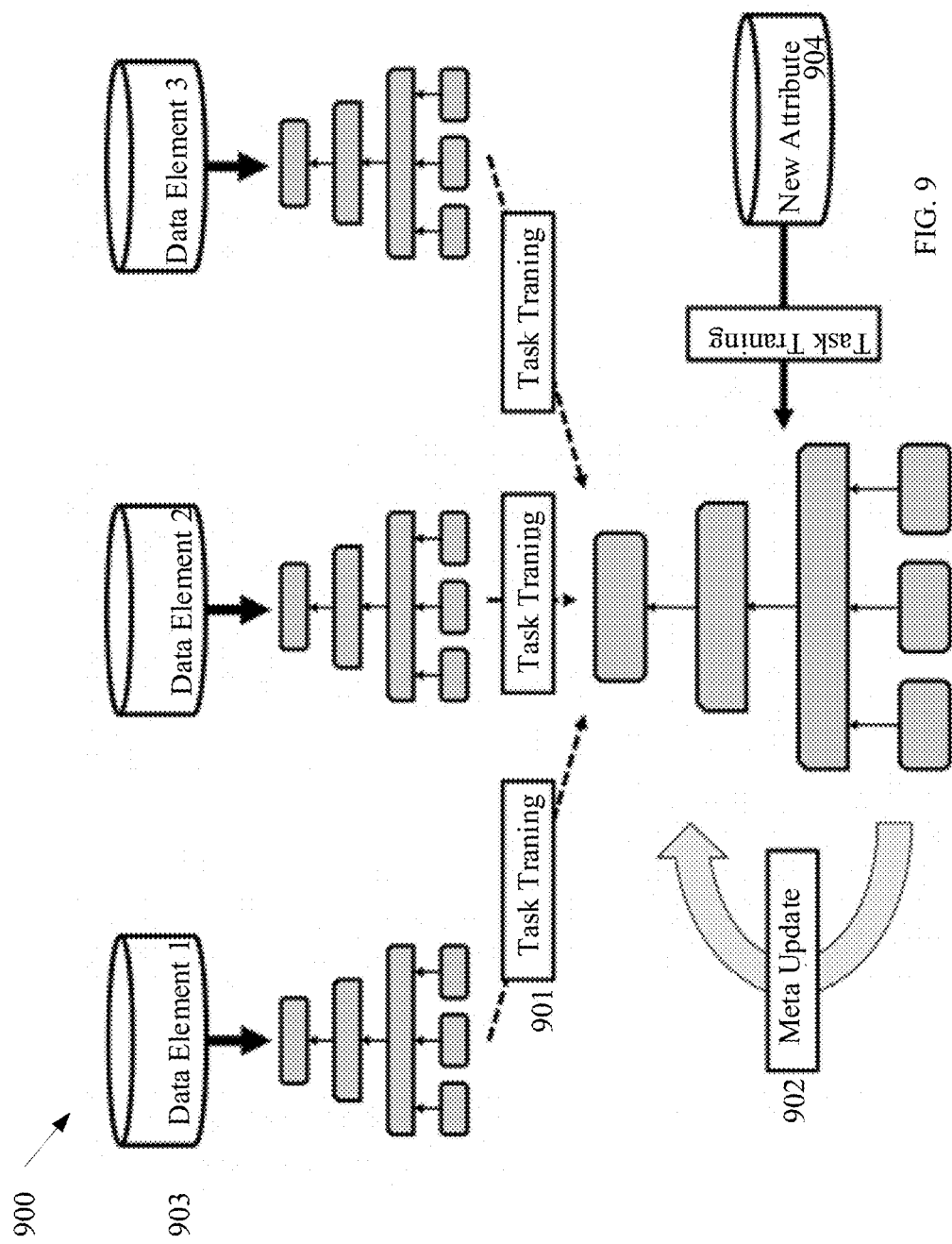
FIG. 9 is a model for meta learning of data element extraction in accordance with an embodiment of the invention.

Referring to FIG. 8 an uncertainty model 800 for confidence score generation is provided in accordance with an embodiment of the invention. The model enables contract data classification and provides data attributes with confidence score. The confidence score is estimated based on the uncertainty of the model. The model uncertainty is obtained by using dropout in the network as a variational approximation. Multiple inference runs are performed with keeping dropout active to obtain a predictive mean and predictive variance of Softmax probabilities. The inverse of predictive variance is used to provide the confidence score for the model prediction. The system of the invention deploys model-agnostic meta-learning where the meta learning model 900 is trained by alternating between two training phases 901 as shown in FIG. 9. The first is an element-specific training where the gradient direction to update the model parameters is obtained by using the data of a single element. The second phase is a meta-update 902 to the model where the gradient direction is obtained by an aggregation of gradient directions from all the data elements 903:

$$\phi_i = \theta - \alpha \nabla \mathcal{L}_{\mathcal{T}_i}(f_\theta)$$

$$\theta \leftarrow \theta - \beta \nabla_\theta \sum_{\mathcal{T}_i} \mathcal{L}_{\mathcal{T}_i}(f_{\phi_i})$$

where $\phi_i$ are the model parameters for a specific task $\mathcal{T}_i$ and $\theta$ are the meta parameters common to all the tasks under meta-learning. $\alpha$, $\beta$ are the learning rates to perform the fine-tuning task and meta training respectively. $f_\theta$ is the model parametrized by parameters $\theta$, $\phi_i$ which actually performs the task of contract clause extraction. The application of meta learning to data element extraction results in performing in data-efficient learning where the model 900 is generalized to a new data element 904 using fewer samples.

Every entity may include certain data attributes/clauses and data elements that are utilized for multiple contracts. These attributes/legal obligations are compiled into a data attribute/clause library and these are referred for creation of the contract. One of the components of the CLM system is to detect the presence/absence of data attributes/clauses in the data attribute/clause library. Since, the bots operate on the data attributes to generate a contract template, it leads to a faster processing time for contract creation. Further, on detecting the presence of any new or modified data attribute/clause, the system also evaluates the deviation of the detected data attribute/clause from the data attribute/clause in the data attribute/clause library. This deviation is presented in the form of highlights in the contract text which can be easily reviewed by an entity. Finally, the combination of presence/absence along with deviations are aggregated to provide a unified risk score to the contract. This is a quantifiable metric that can be used by the contract authors as an estimate of the edits required in the current iteration of contract authoring.

In an embodiment, the presence/absence of clauses from the clause library are detected using a data model 1000 that evaluates sentence similarity between two candidate clauses through sentence encoder as shown in FIG. 10 in accordance with an embodiment of the invention. This model not only captures the word level deviations but also the semantic meaning of the words to evaluate sentence similarity. The sentence similarity model 1000 consists of a sentence encoder 1001 that aggregates the word embeddings of the tokens in the sentence to a single vector that captures the semantic meaning of the network. The sentence encoder 1001 has a CNN architecture like the clause classifier except for the final sigmoid layer. The sentence encoder is trained using multiple neural network models. A pair of similar encoders are used to encode a sentence each and the pair of sentence vectors are passed into a third sentence similarity model that measures the similarity between the two vectors and outputs a probability value. This probability value is a measure of the similarity between the two input sentences. The model is trained by providing training labels of 0 or 1 depending on whether they belong to the same clause category or not. The trained sentence encoder 1001 is used to encode all the clauses detected in a contract and the clauses in the clause library. The clause similarity model used during training framework is used to evaluate the similarity of a clause in the contract with each data attribute/clause in the data attribute/clause library. The template clause with maximum similarity is picked if the probability output by similarity model exceeds a pre-defined threshold. If a template clause match is found, then that clause is tagged as detected within the contract.

Figure 12:
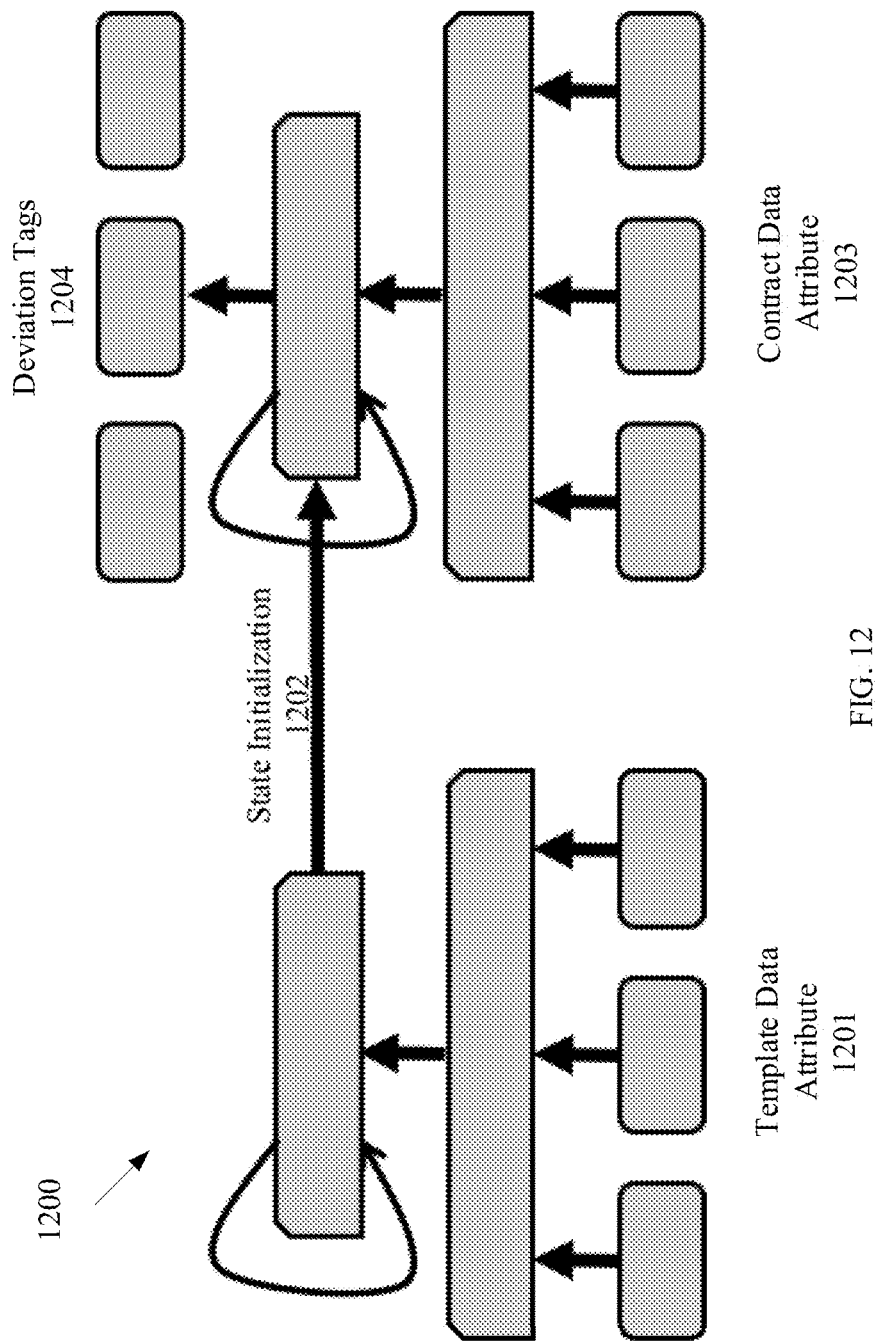
FIG. 12 is a model depicting deviation between data attribute library and contract template text in accordance with an embodiment of the invention.

Referring to FIG. 11 and FIG. 12, a table 1100 and a data model 1200 for data attribute deviation is provided in example embodiments of the invention. The evaluation of deviations for the contract template data attributes/clauses found in the data attribute/clause library is essential for data attribute analysis. Moreover, a deviation in the text can completely alter the meaning of the clause or data attribute. As shown in FIG. 11, the language "agreement may be renewed" and "agreement will be renewed" have completely different implication. This level of accuracy is required for ensuring risk free contract creation. This is implemented as a BIO tagger used for data attribute/Clause extraction where the BIO tagging is conditional on the contract template data attribute/clause used as the reference text. This is achieved using a sequence-to-sequence model which includes an RNN based encoder and decoder. As shown in FIG. 12, the template clause 1201 text is encoded through the RNN encoder and the final state of the encoder is used as an initialization 1202 for the hidden state of the RNN decoder. The RNN decoder outputs for each token in the contract clause text 1203 one of BIO tags 1204. The tokens with the output of either B or I are the tokens which have deviations in them. These tokens are highlighted in the authoring tool for feedback from the contract authors.

The final stage of clause analysis is to provide a unified risk score in a range of 0 to 100 based on the presence/absence of template clauses in the clause library and deviations from the clause library. This is achieved by a weighted summation of risk score per clause in the clause library. The weights assigned to each template clause depends on the importance weight assigned to that clause. For example, a clause on GDPR for data privacy can be considered crucial for contracts implemented within the EU region and would have a larger weight. The sum of all the template clause weights to the value of 100. The risk score assigned to each template clause depends on the output of the models from the previous two paragraphs. Clauses which are absent in the contract have a risk score of 1 contributing in full to the accumulated risk score and contracts which are present are assigned a score of 1−p where p is the probability value indicating the clause similarity score:

$$\text{risk} = \sum_{i=0}^{M} w_i + \sum_{j=0}^{N} w_j \times (1 - p_j)$$

where index i refers to clauses missing from the contract with $w_i$ as its importance weight and index j refers to clauses which are present, $p_j$ is the probability of deviation for a clause present in the contract, and $w_i$ is the importance weight of the corresponding clause. This aggregated risk score (risk) can be used as a metric to evaluate whether further edits to the contract draft are required. For example, a contract with risk score below 10 need not require any further edits.

The present invention utilizes data attribute category code and preferred model mapping to generate confidence score along with a classification for a transaction. Also, the scoring algorithms utilizes the preference of models, calculated during the training phase, to get the classification & confidence in case of conflict.

In an embodiment contract data has generally Name of Parties, multiple legal clauses like confidentiality, indemnification, scope of work, Product or services description, and agreement values. These are the fields based upon which the Contract management system classifies a data attribute into one of pre-defined categories. The categories (a.k.a. taxonomy) are decided in advanced. The laws of different jurisdiction and the description of services is, however, very loosely related to taxonomy of classification and similarly the customized clauses depending on deliverables under the contract are also very less informative on their own to classify a data attribute into a specific taxonomy. The problem becomes more tedious when the number of taxonomies is huge.

In an exemplary embodiment, the present invention may be a system, a method, and/or a computer program product. The computer program product may include a computer readable storage medium (or media) having computer readable program instructions thereon for causing a processor to carry out aspects of the present invention. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device i.e. it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

What is claimed is:

1. A method of contract management comprising:
   receiving a contract creation request through one or more applications at a server;

identifying and analyzing a set of parameters associated with the request by a bot of an AI engine;

based on analysis of the parameters, determining one or more required data attributes and generating at least one data script configured to process the request by the AI engine;

identifying, by a processor coupled to the AI engine, position of the data attributes in a contract and creating a contract template for execution; and in response to receipt of at least one change in the contract template from one or more negotiating entities, identifying by a recommendation engine coupled to the processor and a crawler, risk associated with the at least one change wherein the crawler is initiated to identify and process the at least one change through the bot for determining an action to be performed, wherein the data script includes a set of queries processed by a dynamically generated AI based processing logic including a switching based processing logic, wherein the switching-based processing logic includes dynamic identification of a path for processing of the request based on the at least one data script and determination of multiple data attributes dependent on each other in the contract.

2. The method of claim 1 wherein the set of parameters determine the request as a request for renewal of an existing contract or creation of a new contract, determine an entity as an existing entity or a new entity, and determine a type of contract based on nature of engagement.

3. The method of claim 2, further comprising a step of processing the request by one or more entity specific data model or a contract specific data model or a switching data model configured to switch between the entity specific data model and contract specific data model.

4. The method of claim 3, wherein a datastore includes a historical contract database and one or more entity specific historical contract database for storing a plurality of contract data.

5. The method of claim 4, wherein the entity specific data model is generated by analyzing the plurality of contract data from the entity specific historical contract database wherein the database includes the plurality of contract data extracted after optical character recognition of past executed contracts by the entity.

6. The method of claim 4, wherein the contract specific data model is generated by analyzing the plurality of contract data from the historical contract database wherein the database includes the plurality of contract data extracted after optical character recognition of past executed contracts by one or more entities.

7. A method of contract management comprising:
receiving a contract creation request through one or more applications at a server;
identifying and analyzing a set of parameters associated with the request by a bot of an AI engine;
based on analysis of the parameters, determining one or more required data attributes and generating at least one data script configured to process the request by the AI engine;
identifying by a processor coupled to the AI engine, position of the data attributes in a contract and creating a contract template for execution; and
in response to receipt of at least one change in the contract template from one or more negotiating entities, identifying by a recommendation engine coupled to the processor and a crawler, risk associated with the at least one change, wherein the crawler is initiated to identify and process the at least one change through the bot for determining an action to be performed, wherein a plurality of contract data is extracted from one or more data objects by a data extraction method, wherein the data extraction method comprises:
identifying a type of data object;
sending the data object to at least one data recognition training model for identification of at least one data attribute wherein the data recognition training model processes the data object based on prediction analysis by the bot for obtaining the data attribute with a confidence score;
drawing a bounded box around the identified data attribute by a region of interest script;
cropping the at least one identified data attribute in the drawn box;
extracting text data from the data attribute by optical character recognition; and
validating the text data after processing through an AI based data validation engine.

8. The method of claim 7, wherein the extracted data attributes are compared with a contract data attribute library to detect presence or absence of certain attributes and deviations from a standard contract template in the library wherein the deviations are analyzed to generate a risk score for quantifying the risk involved for an entity on enforcing a contract.

9. A method of contract management comprising:
receiving a contract creation request through one or more applications at a server;
identifying and analyzing a set of parameters associated with the request by a bot of an AI engine;
based on analysis of the parameters, determining one or more required data attributes and generating at least one data script configured to process the request by the AI engine;
identifying by a processor coupled to the AI engine, position of the data attributes in a contract and creating a contract template for execution;
extracting one or more data elements of a data object by processing one or more text surrounding the data elements wherein the data attributes are extracted by executing a sentence level segmentation of the data object and classification of each sentence into a data attribute category; and
in response to receipt of at least one change in the contract template from one or more negotiating entities, identifying by a recommendation engine coupled to the processor and a crawler, risk associated with the at least one change, wherein the crawler is initiated to identify and process the at least one change through the bot for determining an action to be performed, wherein the at least one data script includes a set of queries processed by a dynamically generated AI based processing logic including a switching based processing logic, wherein the switching-based processing logic includes dynamic identification of a path for processing of the request based on the at least one data script and determination of multiple data attributes dependent on each other in the contract.

10. The method of claim 1, wherein the action includes acceptance, rejection, or modification in response to the at least one change.

11. The method of claim 10, further comprising the steps of:

a blockchain based execution of the contract wherein a plurality of linked data blocks captures and authenticate the action performed.

12. The method of claim 11, wherein the data script is generated based on prediction analysis, and deep learning performed on the historical contract database and the one or more entity specific historical contract databases.

13. The method of claim 1, wherein the processing logic further includes is sequential or parallel based processing of the data attributes for generating the data script to ensure faster processing of the request.

14. A method of contract management comprising:
receiving a contract creation request through one or more applications at a server;
identifying and analyzing a set of parameters associated with the request by a bot of an AI engine;
based on analysis of the parameters, determining one or more required data attributes and generating at least one data script configured to process the request by the AI engine, wherein the at least one data script includes a set of queries processed by a switching-based processing logic having dynamic identification of a path for processing of the request based on the at least one data script and determination of the data attributes dependent on each other in a contract;
identifying, by a processor coupled to the AI engine, position of the data attributes in the contract and creating a contract template for execution; and
in response to receipt of at least one change in the contract template from one or more negotiating entities, identifying by a recommendation engine coupled to the processor and a crawler, risk associated with the at least one change wherein the crawler is initiated to identify and process the at least one change through the bot for determining an action to be performed, wherein the switching-based processing logic includes dynamic identification of a path for processing of the request based on the at least one data script and determination of multiple data attributes dependent on each other in the contract.

15. The method of claim 4, further comprising identifying risk associated with clauses in the contract based on one or more risk-identification data models stored in a risk data model database wherein the risk is identified every time the at least one change to data attributes are received from the one or more entities.

16. The method of claim 15, wherein the one or more risk identification data models are trained through deep learning, feedback mechanism, natural language processing of contract data.

17. The method of claim 16, wherein the recommendation engine processes identified risk associated with clauses to recommend modifications to these clauses based on risk scores after processing of information in the contract databases.

18. The method of claim 7, further comprising:
identifying at least one KPI (Key performance indicators) data from the data attributes of the data object;
extracting KPI data by structured based optical character recognition wherein a table in the data object is extracted and the KPI data is obtained for processing; and
determining a productivity/reliability score for the entity based on the extracted KPI data, wherein the entity specific contract database enables processing of the contract data and an aggregated KPI data associated with the entity to generate a productivity/reliability score for the entity.

19. The method of claim 18, wherein the KPI data includes quality assurance of goods, delivery dates, price cards or any obligation to be fulfilled under the executed contract.

20. The method of claim 2, wherein the entity includes a supplier, a client, one or more operations of an enterprise application automatically generating the request based on execution of the one or more operations wherein the one or more operations include purchase order, expiry of an existing contract, sourcing request or occurrence of any such operation triggering the application to generate the request.

21. A contract management system comprising:
a server configured to receive a contract creation request through one or more applications;
an AI engine configured to process the request through a bot wherein the AI engine processes a set of parameters associated with the request to dynamically generate at least one data script and determine one or more required data attributes associated with the request;
a processor coupled to the AI engine enabling the processor to identify positioning of the data attributes in a contract and creating a contract template for execution; and
a recommendation engine coupled to the processor and a crawler to identify risk associated with at least one change in the contract template from one or more negotiating entities wherein a risk score associated with the data attributes based on extent of risk involved is generated by at least one risk identification data model wherein dynamic weights are assigned to the data attributes for computing the risk score wherein in response to receipt of the at least one change in the contract template from the one or more negotiating entities, the crawler identifies and processes the at least one change through the bot for determining an action to be performed, wherein the at least one data script includes a set of queries processed by a dynamically generated AI based processing logic including a switching based processing logic, wherein the switching-based processing logic includes dynamic identification of a path for processing of the request based on the at least one data script and determination of multiple data attributes dependent on each other in the contract.

22. The system of claim 21, further comprising a data store including a historical contract database and one or more entity specific historical contract database for storing a plurality of contract data.

23. The system of claim 22, further comprising a plurality of data model database including one or more entity specific data model database with entity specific data model, one or more contract specific data model database with contract specific data model and at least one switching data model script database for switching between entity specific data model and contract specific data model.

24. The system of claim 23, further comprising a data extraction and mapping module with optical character recognition to extract at least one data attribute from a data object wherein the extracted data attribute is processed to obtaining text data for validation through an AI based data validation engine.

25. The system of claim 24, further comprising a data attribute library configured to enable comparison of the extracted data attribute with the library to detect presence or absence of certain attributes and deviations from a standard contract template in the library wherein the deviations are analyzed to generate a risk score for quantifying the risk involved for an entity on enforcing a contract.

26. A contract management system comprising:
  a server configured to receive a contract creation request through one or more applications;
  an AI engine configured to process the request through a bot wherein the AI engine processes a set of parameters associated with the request to dynamically generate at least one data script and determine one or more required data attributes associated with the request;
  a processor coupled to the AI engine enabling the processor to identify positioning of the data attributes in a contract and creating a contract template for execution; and
  a data analyzer configured to analyze one or more text data surrounding at least one data element to be extracted from a data object wherein the data attributes are extracted by executing a sentence level segmentation of the data object and classification of each sentence into a data attribute category;
  a recommendation engine coupled to the processor and a crawler to identify risk associated with at least one change in the contract template from one or more negotiating entities wherein in response to receipt of the at least one change in the contract template from the one or more negotiating entities, the crawler identifies and processes the at least one change through the bot for determining an action to be performed, wherein the at last one data script includes a set of queries processed by a dynamically generated AI based processing logic including a switching based processing logic, wherein the switching-based processing logic includes dynamic identification of a path for processing of the request based on the at least one data script and determination of multiple data attributes dependent on each other in the contract.

27. The system of claim 21, wherein the one or more applications include enterprise applications (EA) including supply chain management (SCM) applications.

28. The system of claim 21, wherein the AI engine coupled to the processor processes at least one prediction algorithm to generate the data script in real time, wherein the bot creates the data script based on one or more data models associated with the data attributes.

29. The system of claim 21, wherein the system is provided in a cloud or cloud-based computing environment.

30. The system of claim 21, wherein the action includes acceptance, rejection, or modification in response to the at least one change.

31. The system of claim 21, further comprising a risk data model database storing at the least one risk identification data model for identifying risk associated with clauses of a contract by processing of the changes.

32. The system of claim 31, wherein the recommendation engine processes the identified risk clauses to recommend modifications to these risk clauses based on the risk scores after processing of information in an historical contract database.

33. The system of claim 32, further comprising an impact analyzer configured to analyze impact of change in one data attribute on an impacted data attribute of a data object wherein a relation between data attributes created through a graphical data model identifies the impacted data attribute.

34. The system of claim 21, wherein the contract creation request is auto generated based on expiry of previous contract or completion of an enterprise application (EA) including supply chain management (SCM) application operation/task thereby leading to contract creation.

35. The system of claim 24, further comprising a key performance indicator (KPI) data monitoring engine wherein the engine is configured to ensure performance of obligations under the data attributes of a contract by:
  extracting at least one KPI data by structured based optical character recognition wherein a table in the data object is extracted and the KPI data is obtained for processing; and
  determining a productivity/reliability score for the entity based on the extracted KPI data, wherein the entity specific contract database enables processing of the contract data and an aggregated KPI data associated with the entity to generate a productivity/reliability score for the entity.

36. A non-transitory computer-readable medium storing computer-executable instructions that when executed by a computing device cause the computing device to:
  receive a contract creation request through one or more applications at a server;
  identify and analyze a set of parameters associated with the request by a bot of an AI engine;
  based on analysis of the parameters, determine one or more required data attributes and generate at least one data script configured to process the request by the AI engine;
  identify by a processor coupled to the AI engine, position of the data attributes in a contract and create a contract template for execution; and
  in response to receipt of at least one change in the contract template from one or more negotiating entities, identify by a recommendation engine coupled to the processor and a crawler, risk associated with the at least one change wherein the crawler is initiated to identify and process the at least one change through the bot for determining an action to be performed, wherein the at least one data script includes a set of queries processed by a dynamically generated AI based processing logic including a switching based processing logic, wherein the switching-based processing logic includes dynamic identification of a path for processing of the request based on the at least one data script and determination of multiple data attributes dependent on each other in the contract.

37. The method of claim 1, wherein a risk score associated with the data attributes based on extent of the risk is generated by at least one risk identification data model wherein dynamic weights are assigned to the data attributes for computing the risk score.

* * * * *